United States Patent
Elshafie et al.

(10) Patent No.: US 12,244,428 B2
(45) Date of Patent: Mar. 4, 2025

(54) NETWORK ENTITY ASSISTED DECODING FOR REPETITION-BASED TRANSMISSIONS

(71) Applicant: QUALCOMM Incorporated, San Diego, CA (US)

(72) Inventors: Ahmed Elshafie, San Diego, CA (US); Ahmed Attia Abotabl, San Diego, CA (US); Abdelrahman Mohamed Ahmed Mohamed Ibrahim, San Diego, CA (US); Marwen Zorgui, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 18/173,693

(22) Filed: Feb. 23, 2023

(65) Prior Publication Data

US 2024/0291598 A1    Aug. 29, 2024

(51) Int. Cl.
*H04L 1/00* (2006.01)
*H04L 1/1829* (2023.01)
*H04L 1/1867* (2023.01)
*H04L 5/00* (2006.01)

(52) U.S. Cl.
CPC ............ *H04L 1/1864* (2013.01); *H04L 1/189* (2013.01); *H04L 1/1896* (2013.01); *H04L 5/0044* (2013.01)

(58) Field of Classification Search
CPC ..... H04L 1/1864; H04L 1/189; H04L 1/1816; H04L 1/005; H04L 5/0044; H04L 1/1896
See application file for complete search history.

(56) References Cited

U.S. PATENT DOCUMENTS

| | | | |
|---|---|---|---|
| 8,464,139 B2* | 6/2013 | Miyazaki | H03M 13/2975 714/776 |
| 8,959,421 B2* | 2/2015 | Masuda | H03M 13/09 714/752 |
| 10,321,353 B2* | 6/2019 | Kim | H04W 76/14 |
| 10,411,735 B1* | 9/2019 | Chilappagari | H03M 13/116 |
| 10,511,410 B2* | 12/2019 | Castelain | H04L 25/025 |
| 10,530,392 B2* | 1/2020 | Reynwar | H03M 13/3723 |
| 10,951,233 B2* | 3/2021 | Anderson | H03M 13/1111 |
| 11,175,985 B2* | 11/2021 | Lee | H03M 13/3707 |
| 11,381,255 B2* | 7/2022 | Reynwar | H03M 13/1137 |
| 11,456,757 B2* | 9/2022 | Asadi | H03M 13/1128 |
| 11,570,822 B2 | 1/2023 | Wei et al. | |
| 11,658,788 B2* | 5/2023 | Cao | H04L 5/0055 370/329 |
| 2022/0330312 A1 | 10/2022 | Zhou et al. | |

OTHER PUBLICATIONS

International Search Report and Written Opinion—PCT/US2024/012786—ISA/EPO—May 14, 2024 (2206030WO).

* cited by examiner

*Primary Examiner* — Esaw T Abraham
(74) *Attorney, Agent, or Firm* — Holland & Hart LLP

(57) ABSTRACT

Methods, systems, and devices for wireless communications are described. A user equipment (UE) may receive a message, from a network entity, indicating assistance information including a decoding order, decoder iteration instructions, or both, for a first set of repetitions of a data transmission. The UE may monitor for and receive the first set of repetitions from the network entity and decode the first set of repetitions based on the assistance information from the network entity. Based on decoding the first set of repetitions, the UE may transmit a feedback message to the network entity indicating whether the UE successfully decoded the first set of repetitions.

30 Claims, 19 Drawing Sheets

NETWORK ENTITY ASSISTED DECODING FOR REPETITION-BASED TRANSMISSIONS

FIELD OF TECHNOLOGY

The following relates to wireless communications, including network entity assisted decoding for repetition-based transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support network entity assisted decoding for repetition-based transmissions. For example, the described techniques provide for a user equipment (UE) to receive a message indicating a decoding order for the UE to decode a first set of repetitions of a data transmission, a set of iteration instructions indicating a quantity of iterations to perform on the first set of repetitions, or both. The UE may monitor for and receive the first set of repetitions from a network entity. Based on the decoding order, the set of iteration instructions, or both, the UE may decode the first set of repetitions and transmit a feedback message, to the network entity based on the decoding, indicating whether the decoding was successful.

A method is described. The method may include receiving a message indicating a decoding order for the UE to decode a first set of multiple repetitions of a data transmission, iteration instructions indicating a quantity of iterations to perform on the first set of multiple repetitions, or a combination thereof, monitoring for one or more repetitions of the first set of multiple repetitions, and transmitting a feedback message based on decoding the one or more repetitions of the first set of multiple repetitions or iterating the one or more repetitions of the first set of multiple repetitions in accordance with the decoding order, the iteration instructions, or any combination thereof.

An apparatus is described. The apparatus may include a processor, memory coupled with the processor, and instructions stored in the memory. The instructions may be executable by the processor to cause the apparatus to receive a message indicating a decoding order for the UE to decode a first set of multiple repetitions of a data transmission, iteration instructions indicating a quantity of iterations to perform on the first set of multiple repetitions, or a combination thereof, monitor for one or more repetitions of the first set of multiple repetitions, and transmit a feedback message based on decoding the one or more repetitions of the first set of multiple repetitions or iterating the one or more repetitions of the first set of multiple repetitions in accordance with the decoding order, the iteration instructions, or any combination thereof.

Another apparatus is described. The apparatus may include means for receiving a message indicating a decoding order for the UE to decode a first set of multiple repetitions of a data transmission, iteration instructions indicating a quantity of iterations to perform on the first set of multiple repetitions, or a combination thereof, means for monitoring for one or more repetitions of the first set of multiple repetitions, and means for transmitting a feedback message based on decoding the one or more repetitions of the first set of multiple repetitions or iterating the one or more repetitions of the first set of multiple repetitions in accordance with the decoding order, the iteration instructions, or any combination thereof.

A non-transitory computer-readable medium storing code is described. The code may include instructions executable by a processor to receive a message indicating a decoding order for the UE to decode a first set of multiple repetitions of a data transmission, iteration instructions indicating a quantity of iterations to perform on the first set of multiple repetitions, or a combination thereof, monitor for one or more repetitions of the first set of multiple repetitions, and transmit a feedback message based on decoding the one or more repetitions of the first set of multiple repetitions or iterating the one or more repetitions of the first set of multiple repetitions in accordance with the decoding order, the iteration instructions, or any combination thereof.

Some examples of the method, apparatuses, and non-transitory computer-readable medium described herein may further include operations, features, means, or instructions for receiving an indication of a threshold quantity of repetitions, where the one or more repetitions includes the threshold quantity of repetitions, and where the decoding order includes the threshold quantity of repetitions and decoding the one or more repetitions after receiving the threshold quantity of repetitions.

In some examples of the method, apparatuses, and non-transitory computer-readable medium described herein, receiving the message may include operations, features, means, or instructions for receiving an indication of an index value corresponding to decoding the one or more repetitions, where the index value may be based on a time-frequency resource location of the one or more repetitions or a repetition index of the first set of multiple repetitions, and where the decoding order includes the index value and decoding the one or more repetitions starting at the index value.

Some examples of the method, apparatuses, and non-transitory computer-readable medium described herein may further include operations, features, means, or instructions for receiving an indication of a redundancy version (RV) sequence corresponding to a RV pattern and the decoding order, where the one or more repetitions may be received in accordance with the RV sequence and decoding the one or more repetitions in accordance with the RV pattern and the decoding order.

In some examples of the method, apparatuses, and non-transitory computer-readable medium described herein, receiving the message may include operations, features, means, or instructions for receiving, based on at least one of a power change or a state change at a network entity, an indication for the UE to perform a threshold quantity of iterations on a repetition of the one or more repetitions and to combine the iterations with log-likelihood ratios (LLRs) of remaining repetitions of the one or more repetitions, where decoding the one or more repetitions may be in accordance with the indication, the iteration instructions including the indication.

In some examples of the method, apparatuses, and non-transitory computer-readable medium described herein, receiving the message may include operations, features, means, or instructions for transmitting a channel state information (CSI) report based on combining a second set of multiple repetitions in accordance with at least one decoder iteration of a repetition of the second set of multiple repetitions, where the second set of multiple repetitions may be associated with a first set of transmission parameters and receiving a second set of transmission parameters associated with the first set of multiple repetitions, where decoding the one or more repetitions of the first set of multiple repetitions may be in accordance with the second set of transmission parameters.

In some examples of the method, apparatuses, and non-transitory computer-readable medium described herein, the first set of transmission parameters and the second set of transmission parameters include a modulation and coding scheme (MCS), a rank parameter, a power control parameter, a beamforming parameter, a TRP panel parameter, a quantity of repetitions, or any combination thereof.

In some examples of the method, apparatuses, and non-transitory computer-readable medium described herein, the decoding order may be based on a priority of the data transmission, a quality of service of the data transmission, a latency of the data transmission, or any combination thereof.

In some examples of the method, apparatuses, and non-transitory computer-readable medium described herein, the message schedules a downlink shared channel repetition.

In some examples of the method, apparatuses, and non-transitory computer-readable medium described herein, the message may be dedicated to the decoding order, the iteration instructions, or both.

In some examples of the method, apparatuses, and non-transitory computer-readable medium described herein, selectively combining respective LLRs associated with the one or more repetitions based on a first comparison between the respective LLRs associated with the one or more repetitions, a second comparison between a ratio of the respective LLRs and a parameter, or both, where decoding the one or more repetitions may be based on the selective combining of the respective LLRs.

Some examples of the method, apparatuses, and non-transitory computer-readable medium described herein may further include operations, features, means, or instructions for determining a coefficient for combining respective LLRs associated with the one or more repetitions based on a prior data transmission on a same beam as the data transmission, a CSI measurement, a sounding reference signal measurement, or any combination thereof, where decoding the one or more repetitions may be based on combining the respective LLRs in accordance with the coefficient.

Some examples of the method, apparatuses, and non-transitory computer-readable medium described herein may further include operations, features, means, or instructions for demodulating, at a first demodulator associated with the UE, a repetition of the one or more repetitions to obtain a first demodulated signal corresponding to the data transmission and to obtain a first LLR, selectively demodulating, at a second demodulator associated with the UE, the repetition of the one or more repetitions to obtain a second demodulated signal corresponding to the data transmission and to obtain a second LLR, where selectively demodulating the repetition may be based on a first cyclic redundancy check (CRC) of the first demodulated signal, and selectively combining the first LLR and the second LLR based on a second CRC of the second demodulated signal, where decoding the one or more repetitions may be based on at least one of demodulating the repetition at the first demodulator, selectively demodulating the repetition at the second demodulator, or selectively combining the first LLR and the second LLR.

In some examples of the method, apparatuses, and non-transitory computer-readable medium described herein, the feedback message indicates a successful demodulation of the repetition based on demodulating the repetition at the first demodulator.

Some examples of the method, apparatuses, and non-transitory computer-readable medium described herein may further include operations, features, means, or instructions for refraining from demodulating the repetition at the second demodulator and refraining from combining the first LLR and the second LLR based on the successful demodulation of the repetition.

In some examples of the method, apparatuses, and non-transitory computer-readable medium described herein, the feedback message indicates a successful demodulation of the repetition based on demodulating the repetition at the second demodulator.

Some examples of the method, apparatuses, and non-transitory computer-readable medium described herein may further include operations, features, means, or instructions for refraining from combining the first LLR and the second LLR based on the successful demodulation of the repetition.

In some examples of the method, apparatuses, and non-transitory computer-readable medium described herein, the feedback message indicates a successful demodulation of the repetition based on a third CRC associated with combining the first LLR and the second LLR passing.

In some examples of the method, apparatuses, and non-transitory computer-readable medium described herein, the feedback message indicates a failed demodulation of the repetition based on a third CRC associated with combining the first LLR and the second LLR failing.

A method for wireless communication at a network entity is described. The method may include transmitting a message indicating a decoding order for a UE to decode a first set of multiple repetitions of a data transmission, iteration instructions indicating a quantity of iterations to perform on the first set of multiple repetitions, or a combination thereof, transmitting one or more repetitions of the first set of multiple repetitions, and receiving a feedback message corresponding to the one or more repetitions of the first set of multiple repetitions based on the message.

An apparatus for wireless communication at a network entity is described. The apparatus may include a processor, memory coupled with the processor, and instructions stored in the memory. The instructions may be executable by the processor to cause the apparatus to transmit a message indicating a decoding order for a UE to decode a first set of multiple repetitions of a data transmission, iteration instructions indicating a quantity of iterations to perform on the first set of multiple repetitions, or a combination thereof, transmit one or more repetitions of the first set of multiple repetitions, and receive a feedback message corresponding to the one or more repetitions of the first set of multiple repetitions based on the message.

Another apparatus for wireless communication at a network entity is described. The apparatus may include means for transmitting a message indicating a decoding order for a UE to decode a first set of multiple repetitions of a data transmission, iteration instructions indicating a quantity of iterations to perform on the first set of multiple repetitions, or a combination thereof, means for transmitting one or more repetitions of the first set of multiple repetitions, and means for receiving a feedback message corresponding to the one or more repetitions of the first set of multiple repetitions based on the message.

A non-transitory computer-readable medium storing code for wireless communication at a network entity is described. The code may include instructions executable by a processor to transmit a message indicating a decoding order for a UE to decode a first set of multiple repetitions of a data transmission, iteration instructions indicating a quantity of iterations to perform on the first set of multiple repetitions, or a combination thereof, transmit one or more repetitions of the first set of multiple repetitions, and receive a feedback message corresponding to the one or more repetitions of the first set of multiple repetitions based on the message.

Some examples of the method, apparatuses, and non-transitory computer-readable medium described herein may further include operations, features, means, or instructions for transmitting an indication of a threshold quantity of repetitions, where the one or more repetitions includes the threshold quantity of repetitions, and where the decoding order includes the threshold quantity of repetitions.

In some examples of the method, apparatuses, and non-transitory computer-readable medium described herein, transmitting the message may include operations, features, means, or instructions for transmitting an indication of an index value corresponding to decoding the one or more repetitions at the UE, where the index value may be based on a time-frequency resource location of the one or more repetitions or a repetition index of the first set of multiple repetitions, and where the decoding order includes the index value.

Some examples of the method, apparatuses, and non-transitory computer-readable medium described herein may further include operations, features, means, or instructions for transmitting an indication of a RV sequence corresponding to a RV pattern and the decoding order, where the one or more repetitions may be transmitted in accordance with the RV sequence.

In some examples of the method, apparatuses, and non-transitory computer-readable medium described herein, transmitting the message may include operations, features, means, or instructions for transmitting, based on at least one of a power change or a state change at a network entity, an indication for the UE to perform a threshold quantity of iterations on a repetition of the one or more repetitions and to combine the iterations with LLRs of remaining repetitions of the one or more repetitions, the iteration instructions including the indication.

In some examples of the method, apparatuses, and non-transitory computer-readable medium described herein, transmitting the message may include operations, features, means, or instructions for transmitting a second set of multiple repetitions associated with a first set of transmission parameters, receiving a CSI report based on the second set of multiple repetitions, and transmitting a second set of transmission parameters associated with the first set of multiple repetitions.

In some examples of the method, apparatuses, and non-transitory computer-readable medium described herein, the first set of transmission parameters and the second set of transmission parameters include an MCS, a rank parameter, a power control parameter, a beamforming parameter, a transmission-reception point (TRP) panel parameter, a quantity of repetitions, or any combination thereof.

In some examples of the method, apparatuses, and non-transitory computer-readable medium described herein, the decoding order may be based on a priority of the data transmission, a quality of service of the data transmission, a latency of the data transmission, or any combination thereof.

In some examples of the method, apparatuses, and non-transitory computer-readable medium described herein, the message schedules a downlink shared channel repetition.

In some examples of the method, apparatuses, and non-transitory computer-readable medium described herein, the message may be dedicated to the decoding order, the iteration instructions, or both.

In some examples of the method, apparatuses, and non-transitory computer-readable medium described herein, the feedback message indicates a successful demodulation of the one or more repetitions.

In some examples of the method, apparatuses, and non-transitory computer-readable medium described herein, the feedback message indicates a failed demodulation of the one or more repetitions.

DETAILED DESCRIPTION

In some wireless communications systems, wireless devices may communicate signaling using repetitions to reduce signaling errors, and consequently improve transmission reliability and latency. For example, there may be multiple cases where a receiving device, may receive different transmissions (e.g., repetitions) of the same transport block, data, or information. In some cases, the receiving device may have multiple antennas (e.g., 8 antennas) to receive the repetitions, may receive the repetitions from multiple transmission-reception points (TRPs), the receiving device may receive downlink control channel repetitions with log-likelihood ratios (LLRs) combined between occasions of the repetitions, or the receiving device may receive downlink shared channel repetitions, or any combination thereof. In some examples, the receiving device may determine how to decode the repetitions without assistance from a network entity. However, determining how to decode the repetitions may cause high power consumption and inefficient use of time-frequency resources at the receiving device due to unnecessary decoding of the repetitions.

Techniques of the present disclosure describe a network entity providing assistance information to a user equipment (UE) on how to decode repetitions in order to reduce power consumption and increase efficiency related to use of time-frequency resources. The network entity may transmit the assistance information, which may include a decoding order, decoder iteration information, repetition combining order, or any combination thereof to the UE prior to sending the repetitions, or during a period in which the UE is waiting for a repetition and has determined to decode the repetitions at a later time. In some examples, the UE may wait to receive a threshold quantity of repetitions or until an index (e.g., repetition replica or slot index) prior to decoding. In some cases, the UE may perform a threshold quantity of decoder iterations on a repetition, and then combine the repetition with one or more other repetitions. Additionally, or alternatively, the UE may two or more repetitions prior to performing the threshold quantity of decoder iterations as to reduce the power consumption associated with decoding a repetition of a quantity of iterations. Following decoding, the UE may transmit a feedback message, such as an acknowledgement (ACK) message or a negative acknowledgement (NACK) message, indicating whether the repetitions were decoded successfully.

Aspects of the disclosure are initially described in the context of wireless communications systems. Additional aspects of the disclosure are described with reference to a wireless communication system and a process flow. Aspects of the disclosure are further illustrated by and described with reference to apparatus diagrams, system diagrams, and flowcharts that relate to network entity assisted decoding for repetition-based transmissions.

Figure 1:
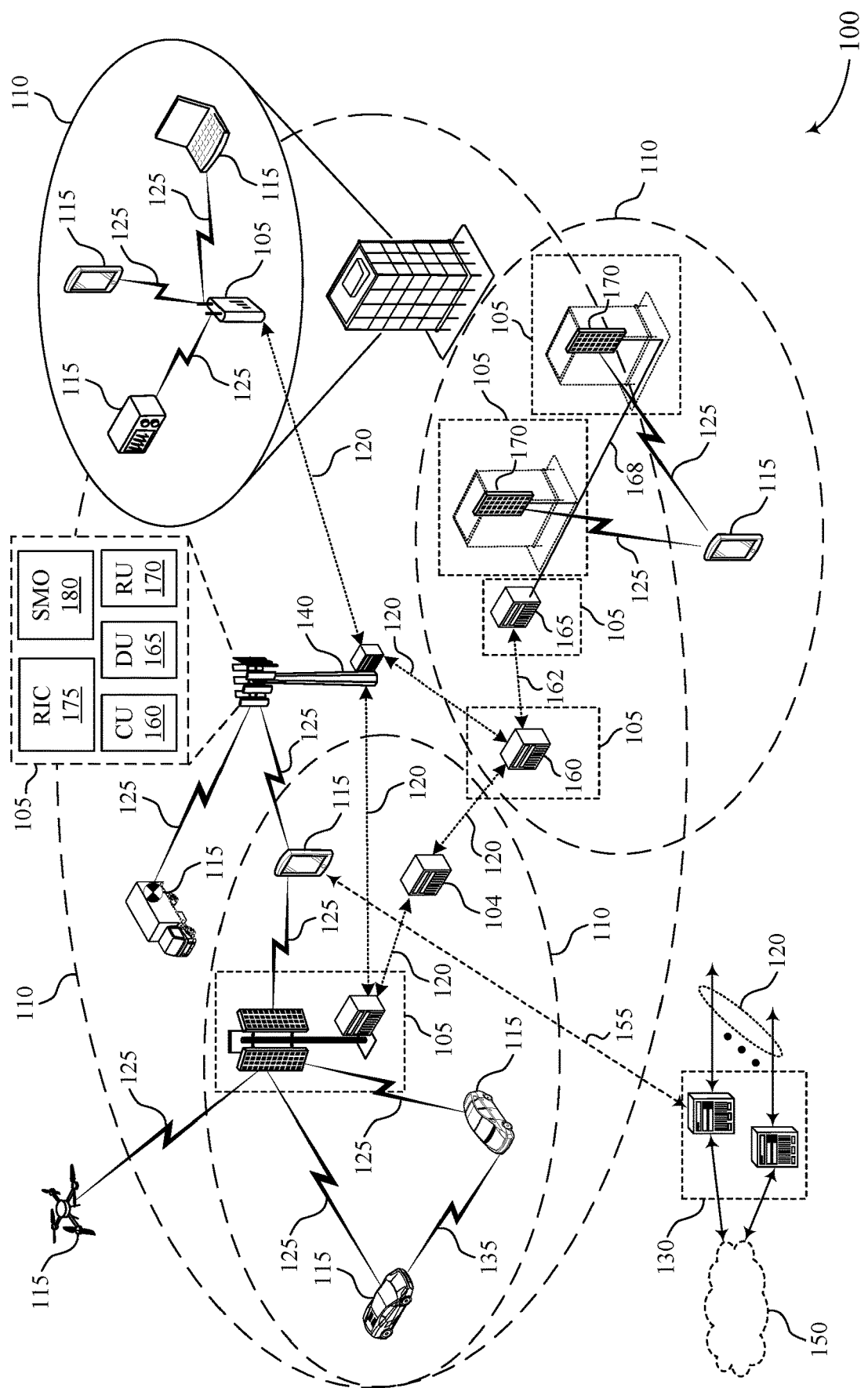
FIGS. 1 and 2 illustrate examples of a wireless communications system that supports network entity assisted decoding for repetition-based transmissions in accordance with one or more aspects of the present disclosure.

FIG. 1 illustrates an example of a wireless communications system 100 that supports network entity assisted decoding for repetition-based transmissions in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support network entity assisted decoding for repetition-based transmissions as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel quantity (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame quantity (SFN) (e.g., ranging from 0 to 1023).

Each frame may include multiple consecutively-quantityed subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples of the wireless communications system 100, wireless devices (e.g., a network entity 105, a UE 115, or both) may communicate signaling using repetitions to reduce signaling errors, and consequently improve transmission reliability and latency. For example, there may be multiple cases where a receiving device (e.g., a UE 115), may receive different transmissions (e.g., repetitions) of the same transport block, data, or information. In some cases, the receiving device may have multiple antennas (e.g., 8 antennas) to receive the repetitions, may receive the repetitions from multiple TRPs, the receiving device may receive downlink control channel repetitions with LLRs combined between occasions of the repetitions, the receiving device may receive downlink shared channel repetitions, or any combination thereof. In some examples, the receiving device may determine how to decode the repetitions without assistance from a network entity. However, determining how to decode the repetitions may cause high power consumption and inefficient use of time-frequency resources at the receiving device due to unnecessary decoding of the repetitions.

Techniques of the present disclosure describe a network entity 105 providing assistance information to a UE 115 on how to decode repetitions in order to reduce power consumption and increase efficiency related to use of time-frequency resources. The network entity 105 may transmit the assistance information, which may include a decoding order, decoder iteration information, repetition combining order, or any combination thereof to the UE 115 prior to sending the repetitions, or during a period in which the UE 115 is waiting for a repetition and has determined to decode the repetitions at a later time. In some examples, the UE 115 may wait to receive a threshold quantity of repetitions or until an index (e.g., repetition replica or slot index) prior to decoding. In some cases, the UE 115 may perform a threshold quantity of decoder iterations on a repetition, and then combine the repetition with one or more other repetitions. Additionally, or alternatively, the UE 115 may two or more repetitions prior to performing the threshold quantity of decoder iterations as to reduce the power consumption associated with decoding a repetition of a quantity of iterations. Following decoding, the UE 115 may transmit a feedback message, such as an ACK message or a NACK message, indicating whether the repetitions were decoded successfully.

Figure 2:
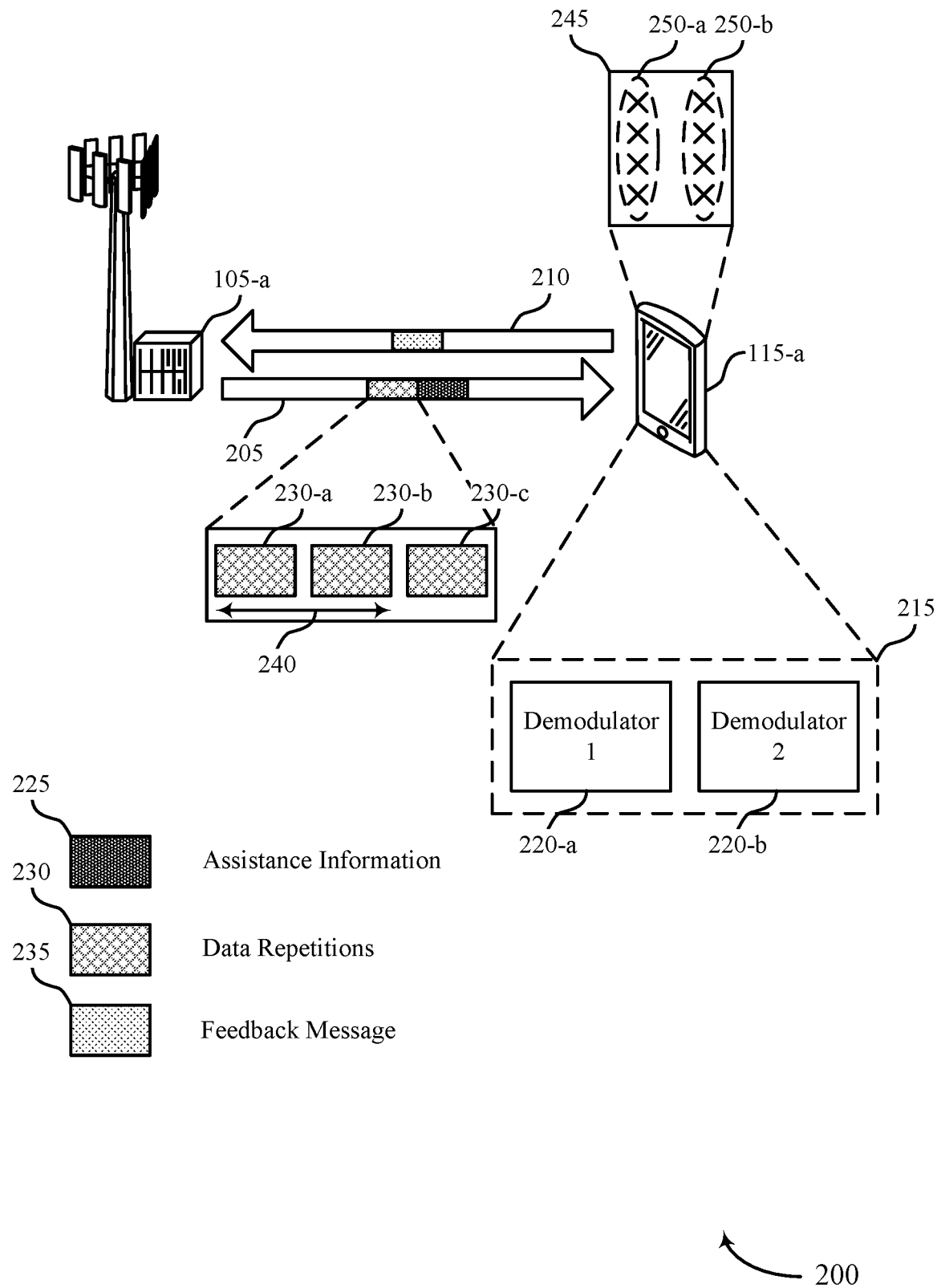

FIG. 2 illustrates an example of a wireless communication system 200 that supports network entity assisted decoding for repetition-based transmissions in accordance with one or more aspects of the present disclosure. In some examples, the wireless communication system 200 may implement or be implemented by the wireless communication system 100. For example, the wireless communication system 200 may include a UE 115-a and a network entity 105-a, which may represent examples of corresponding devices described herein. In this example, the UE 115-a may receive, from the network entity 105-a, one or more data repetitions 230 via a downlink channel 205 and attempt to decode the data repetitions 230 at a decoder 215 using a first demodulator 220-a and a second demodulator 220-b. The UE 115-a may transmit, to the network entity 105-a, a feedback message 235 via an uplink channel 210 indicating whether the UE 115-a demodulated the data repetitions 230 using the decoder 215. In some examples, the UE 115-a may receive the data reptations 230 from another UE 115, such as via a sidelink communication link.

In some cases, the UE 115-a may receive different transmissions of the same transport block, data, or information (e.g., the data repetitions 230). In some examples, the UE 115-a may be configured with an antenna panel 245 with eight antenna elements 250 for reception of the data repetitions 230. In some cases, UEs 115 may use an increased quantity of receiving antennal elements to enable the UEs 115 to support higher layer signaling. For example, the UE 115-a may be configured with the antenna panel 245 including eight receiving antenna elements 250 which may support eight downlink layers. However, this structure may use an advanced receiver architecture to decouple the eight different layers (e.g., a MIMO decoder), which may increase the complexity of baseband processing and decoding the data repetitions 230 at the UE 115-a.

In some examples, the UE 115-a may leverage an antenna architecture of four receiving antennas when receiving the data repetitions 230. For example, the UE 115-a may use a first set of antenna elements 250-a and a second set of antenna elements 250-b to receive the data repetitions 230, where both the first set of antenna elements 250 and the second set of antenna elements 250 include four reception antenna elements. The UE 115-a may receive a first data transmission 230-a using the first set of antenna elements 250-a and receive the first data repetition 230-b of the first data transmission 230-a using the second set of antenna elements 250-b. The first data transmission 230-a and the first data repetition 230-b may be copies of a same data transmission, transport block, or information and may both be referred to as data repetitions 230 herein.

In some other cases, the UE 115-a may receive the data repetitions 230 from multiple TRPs. For example, a first TRP may transmit the first data repetition 230-a and a second TRP may transmit the second data repetition 230-b and a third data repetition 230. Each TRP may transmit the data repetitions 230 using a different time division multiplexing (TDM), frequency division multiplexing (FDM), or space division multiplexing (SDM) scheme. For multi-TRP (mTRP) transmissions, there may be different modes for transmitting the data repetitions 230. A first mode may be defined as when a single physical downlink control channel (PDCCH) is used for scheduling communications via the TRPs, for ideal backhaul (e.g., relatively high throughput and relatively low latency backhaul, such as dedicated point-to-point connection using optical fiber) and/or relatively small delay backhaul between TRPs. The first mode may have one continuous wave with different spatial layers coming from different TRPs. For example, one continuous wave may map to four downlink layers (e.g., layers one to two from a first TRP and layers three to four from a second TRP). A second mode may be defined as when multiple PDCCH channels are used for scheduling communications via the TRPs, for both ideal and non-ideal backhaul (e.g., backhaul such as digital subscriber line (DSL), microwave, and other backhauls like relaying). The first PDCCH may schedule a first continuous wave (e.g., transmitted from the first TRP) and a second PDCCH may schedule a second continuous wave (e.g., transmitted from the second TRP). In some cases, the scheduling resources may be overlapping, partially overlapping, or non-overlapping in the time and frequency domains. To differentiate the TRPs, there may be a field in a DCI message (e.g., a HARQ process ID) used to indicate if a grant for a transmission corresponds to the first physical downlink shared channel (PDSCH) (e.g., from the first TRP) or the second PDSCH (e.g., from the second TRP). In the mTRP operation, the operation in a given serving cell may be defined with two DCI modes. A single-DCI mode may be applicable to ideal backhaul and may have different PDSCH schemes for increased robustness of communications (e.g., SDM, FDM, TDM). A multi-DCI mode may be applicable to ideal or non-ideal backhaul. In the multi-DCI mode, a carrier aggregation (CA) framework for the UE 115-a to treat the different TRPs as different virtual carrier components (CCs). Such modes may be used for the UE 115-a to receive the data repetitions 230 from the multiple TRPs.

In some cases, when configured to communicate via multiple TRPs, the UE 115-a may be RRC configured with M transmission configuration indication (TCI) states, at least for the purposes of quasi co-located (QCL) indications. In some cases, network entity 105-a may use a medium access control-control element (MAC-CE) to select up to $2^N$ TCI states (e.g., 8 TCI states) out of the M TCI states for PDSCH QCL indications. In such cases, N bits in a DCI message (e.g., the DCI activation message) may dynamically indicate the TCI state for a PDSCH transmission (e.g., N=3). Each TCI state may include at least one set of reference signals (RS) for different QCL types (e.g., downlink RS: synchronization signal block (SSB) and periodic, semi-periodic, and aperiodic CSI-RS/transmission RSs).

In some cases, there may be two modes for a DCI message indicating QCL associations between demodulation reference signals (DMRSs) and the multiple TRPs. In a first mode, for a QCL indication of DMRSs for a PDSCH via the DCI signaling, a TCI field may point to two QCL relationships referring to two sets of RS for two DMRS port groups. In a first DMRS port group for layers coming from the first TRP, the DMRSs from the first DMRS port group may be QCL with a RS from the first TRP. In a second DMRS port group for layers coming from the second TRP, the DMRSs from the second DMRS port group may be QCL with a RS from the second TRP. For either group, the DCI signaling may indicate the DMRS port groups. For example, the DCI signaling may indicate which port group a DMRS may be derived from. In a second mode, each DCI may correspond to a single QCL relationship (e.g., in TCI state fields) since the layers for the scheduled continuous waves may come from a single TRP. As such, the DCI may be similar to a DCI in a single TRP scenario, and two different DCI messages may correspond to two different QCL relationships associated with the first TRP and the second TRP. Using such DCI signaling, the UE 115-a may determine which DMRSs to use for demodulating and decoding the data repetitions 230 received via one or more TRPs.

In some other cases, the UE 115-a may receive PDCCH repetitions (e.g., the data repetitions 230) with different LLRs between different downlink control information (DCI) occasions, or the UE 115-a may receive PDSCH repetitions (e.g., the data repetitions 230) of the same data transmission, transport block, or information. Generally, the UE 115-a may receive and decode the data repetitions 230, from different receive antenna elements 250, multiple TRPs, or a PDCCH or PDSCH channel. In some examples, the UE 115-a may receive the first data transmission 230-a followed by the one or more repetitions of the first data transmission 230-a (e.g., the data repetition 230-b and the data repetition 230). In some cases, the UE 115-a may receive the first data transmission 230-a and start to decode the first data transmission 230-a using the decoder 215 at the UE 115-a, while receiving the other data repetitions 230. The UE 115-a may decode the first data transmission 230-a for a quantity of iterations. Following decoding the first data transmission 230-a, the UE 115-a may decode the first data repetition 230-b for the quantity of iterations and then combine the decoded data repetition 230-a with the decoded data repetition 230-b. The UE 115-a may then decode the combined data repetition 230 for the quantity iterations. The UE 115-a may continue such process until the UE 115-a has decoded and combined all the data repetitions 230 received from the network entity 105-a (e.g., data repetition 230-a, data repetition 230-b, and data repetition 230).

Upon decoding all the data repetitions 230, the UE 115-a may transmit, to the network entity 105-a via the uplink channel 210, a feedback message 235. In some examples, the feedback message 235 may be an example of a HARQ-ACK feedback message. In some cases, the UE 115-a may transmit an ACK indicating that the UE 115-a has successfully decoded the data transmission or transport block from the data repetitions 230. However, in some other cases, the UE 115-a may transmit a NACK indicating that the UE 115-a has failed to successfully decode the data transmission or transport block from the data repetitions 230.

In some examples, the order the UE 115-a receives the repetitions may generate issues with decoding, such as contribute to the UE 115-a not being able to successfully decode the data repetition 230. For example, the network entity 105-a may change the transmit power dynamically to support power savings at the network entity 105-a. In some cases, the network entity 105-a may transmit the first data repetition 230-a using a first power level (e.g., P1) and transmit the second data repetition 230-b using a second power level (e.g., P2). P2 may be greater than P1, or P2 may be less than P1. As such, the UE 115-a may not decode the data repetitions 230 correctly or successfully based on such power changes. Additionally, or alternatively, the processes of decoding may cause a high level of power consumption at the UE 115-a, especially if the UE 115-a is a low power device. In such cases, the UE 115-a may not have enough power to complete the decoding process as described herein, and may transmit a NACK in the feedback message 235 based on a power level of the UE 115-a.

In some cases, the network entity 105-a may transmit assistance information 225 to the UE 115-a to enhance decoding procedures at the UE 115-a (e.g., via a DCI message). For example, the assistance information 225, from the network entity 105-a, may include a decoding order to reduce the complexity of decoding the data repetitions 230 and reduce the power consumption of decoding the data repetitions 230. The decoding order may be based on the pathloss from a TRP or the increase or decrease of power at the network entity 105-a between the data repetitions 230. In some other cases, the assistance information 225 may include combining parameters to combine data repetitions 230 or iteration instructions for the decoder 215. In some examples, the network entity 105-a may determine such combining parameters via sounding reference signal (SRS) measurements from the UE 115-a. For example, the network entity 105-a may estimate the quality of a downlink channel at given times and power levels using the SRS measurements from the UE 115-a. In some cases, the UE 115-a may transmit the SRS measurements periodically, semi-persistently, or aperiodically. For example, the UE 115-a may transmit an SRS measurement to the network entity 105-a based on a change in the transmission parameters from the network entity 105-a (e.g., increase or decrease in transmission power). As such, the network entity 105-a may determine the downlink channel qualities at transmission power levels. In some other examples, the network entity may estimate the quality of the downlink channel based on CSI reports from the UE 115-a. Similar to the SRS measurements, the UE 115-a may transmit the CSI reports periodically, semi-periodically, or aperiodically based on a change in transmission parameters at the network entity 105-a.

Additionally, or alternatively, the network entity 105-a may estimate the quality of the downlink channel based on a history of ACKs from the UE 115-a at different power levels or other transmission parameters. For example, the UE 115-a may have transmitted a higher quantity of ACK messages compared to NACK messages at the first power level of the network entity 105-a (e.g., P1) or from the first TRP compared to the second power level of the network entity 105-a (e.g., P2) or from the second TRP. Based on the ACK history, the network entity 105-a may determine that data repetitions 230 transmitted at the first power level or the first TRP may be more reliable that the data repetitions 230 transmitted at the second power level or the second TRP. As such, the assistance information 225 may indicate for the UE 115-a to decode the data repetition 230 that corresponds to the first power level or the first TRP before the other data repetitions, or combine the data repetitions 230 with other data repetitions from the same TRP or with similar power levels and then decode the combined data repetition 230 instead of individually decoding the data repetitions 230.

In some cases, if the UE 115-a has already received a quantity of data repetitions 230 and has determined to decode the data repetitions at a later time, the UE 115-a may wait before receiving the next data repetition 230. For example, the UE 115-a may receive two data repetitions (e.g., the data repetition 230-a and the data repetition 230-b) and wait before receiving the data repetition 230. During this wait period, the network entity 105-a may determine to send the assistance information 225 indicating a decoding order or combining indication to the UE 115-a.

The assistance information 225 may indicate to the UE 115-a when to start decoding, to wait and combine data repetitions 230 before starting to decode the data repetitions 230, or both. In some cases, the network entity 105-a may transmit the assistance information 225 to low power UEs 115. Such low power UEs 115 may report NACKs in the feedback message 235, as the UEs 115 may not have enough power to fully decode each data repetition individually. As such, the assistance information 225 may indicate to the low power UEs 115 when to decode the data repetitions 230 and which data repetitions 230 may be combined before decoding.

The UE 115-a may receive the data repetitions 230 via a DCI scheduling PDSCH repetitions, a non-scheduling DCI, RRC, or MAC-CE messages. In some cases, the network entity 105-a may indicate, via the assistance information 225, that the UE 115-a should wait until the UE 115-a receives a quantity of repetitions, Y, or until after a wait period 240 (e.g., in which the UE 115-a may receive the Y repetitions) before decoding. As such, the UE 115-a may be configured with the wait period 240, where the wait period 240 indicates to the UE 115-a to wait until the UE 115-a has received at least two data repetitions 230 (e.g., data repetition 230-a and data repetition 230-b) or for a given amount of time, before decoding the data repetitions 230, combining the data repetitions 230, or both. The wait period 240 may be a function of a condition (e.g., priority, quality of service (QOS), or latency) of the data packet, transport block, or information packet. For example, the network entity 105-a may determine that due to a latency or priority of transmissions, the later data repetitions 230 (e.g., data repetition 230-b and data repetition 230-c) may be more accurate. Additionally, or alternatively, the network entity 105-a may determine that to enhance the ability to decode the data repetitions 230 (e.g., enhancing the QoS), the UE 115-a should wait to receive multiple repetitions before decoding or combining.

In some examples, the assistance information 225, from the network entity 105-a, may indicate the wait period 240 in conjunction with an index of the data repetition 230-b that indicates that the UE 115-a should decode the data repetition 230-b before the data repetition 230-a. This indication may be determined based on the network entity 105-a determining that the data repetition 230-b may be more reliable or easier to decode than the data repetition 230-a. As such, the UE 115-a may wait to decode any of the data repetitions until the UE 115-a has received the indicated data repetition 230-b.

In some other examples, the assistance information 225 may indicate for the UE 115-a to combine two or more data repetitions 230 and then decode the data repetitions 230 using the decoder 215 (e.g., a low-density parity-check (LDPC) decoder or polar decoder). In such examples, the assistance information 225 may indicate the UE 115-a to wait for the wait period 240, so the UE 115-a may receive both the data repetition 230-a and the data repetition 230-b, combine the two data repetitions 230, and then decode the combined data repetition. As such, the assistance information 225 may save the UE 115-b time and processing power, as the UE 115-a may perform a singular set of iterations of the decoder on the combined data repetition 230 compared to iterating the decoder on each data repetition 230 (e.g., the data repetition 230-a and the data repetitions 230-b) individually and then decoding the combined data repetition 230. Such processes of waiting for a wait period 240, decoding at an indicated index, or waiting and combining data repetitions may also apply to data repetitions received from multiple TRPs.

Instead of using a control message to indicate the assistance information 225, the network entity 105-a may use a redundancy version (RV) sequence for activation of the assistance information 225. In some cases, when the UE 115-a receives a quantity, K, of the same index for the same transport block, the UE 115-a may determine that the process of combining repetitions or waiting to receive a quantity of repetitions before decoding or combining, as described herein, may be activated. For example, the UE 115-a may receive an RRC sequence index of RV={0, 0, 0, 0} (e.g., indicating that the UE 115-a has received the same data transmission four times), where the sequence may indicate the UE 115-a to use the default pattern of RV, {0, 2, 3, 1}, which may be cyclically repeated for additional repetitions. As such, the UE 115-a may decode the data repetitions 230 at an order defined by an RRC, MAC-CE, or DCI message (e.g., decode via the order described by the RV sequence). In some cases, the network entity 105-a may define a non-numeric RV index for the process of decoding the data repetitions 230. The UE 115-a may obtain the sequence of decoding from the RRC, MAC-CE, DCI message. As such, receiving the K, quantity of the same index may indicate an activation or deactivation of the process described herein of receiving a decoding or combing order of the data repetitions 230.

In some cases, the network entity 105-a, may indicate, via the assistance information 225, for the UE 115-a to run the decoder 215 for a quantity of iterations for a data repetition 230 before combining with one or more other data repetitions 230, or after combining the data repetitions. This indication may be based on previous SRS or CSI measurements or power changes at the network entity 105-a. In some examples, the power change at the network entity 105-a may include a power state change or TCI state change.

The UE 115-a may prepare a CSI report for the network entity 105-a using the received data repetitions 230 (e.g., one or more PDSCH repetitions or combined PDSCH repetitions). The CSI report may be parameterized by a quantity of decoder iterations (e.g., LDPC iterations) or a procedure. The procedure may include the UE 115-a iterating the decoder 215 for a quantity of iterations, L1, on the first data repetition 230-a, iterating the decoder 215 for a quantity of iterations, L4, on a fourth data repetition 230, and combining the first data repetition 230-a and the fourth data repetition 230. Following the UE 115-a transmitting the CSI report, the network entity 105-a may determine and indicate an updated modulation and coding scheme (MCS), rank, power control configuration, transmission configuration, or any combination thereof to the UE 115-a. The transmission configuration may include an MCS, a power control configuration, a beamforming configuration (e.g., analog and digital beamforming configuration), a rank of transmissions, indication of which TRPs or TRP panels to use if there are multiple TRPs or TRP panels, or a quantity of repetitions to be received.

In some cases, when receiving the data repetitions 230 from the network entity 105-a or multiple TRPs using the antenna panel 245, as indicated by the transmission configuration from the network entity 105-a, the UE 115-a may interpret a single data transmission as one or more data repetitions 230. For example, if the UE 115-a receives a PDSCH or PDCCH transmission from the network entity 105-a or a TRP via the antenna panel 245, the first set of antenna elements 250-a and the second set of antenna elements 250-b may both receive the same PDSCH or PDCCH transmission (e.g., the data repetition 230) and interpret the single data transmission as two data repetitions 230 (e.g., data repetition 230-a and data repetition 230-b) of the data transmission. Additionally, or alternatively, the UE 115-a may use the first set of antenna elements 250-a to receive a data transmission (e.g., data repetition 230-a) from a first TRP and the second set of antenna elements 250-a to receive a repetition of the data transmission (e.g., data repetition 230-b) from a second TRP.

When receiving transmissions and/or repetitions, the UE 115-a may use the first demodulator 220-a for demodulating the data repetition 230-a and the second demodulator 220-b for demodulating the data repetition 230-b. The UE 115-a may use the first demodulator 220-a for demodulating communication signals received via the first set of antenna elements 250-a and the second demodulator 220-b for demodulating communication signals received via the second set of antenna elements 250-b. If indicated via the assistance information 225, the UE 115-a may combine the LLRs of the demodulated data repetitions 230 to decode the data transmission using the decoder 215. An LLR is the log-domain ratio of the probability a bit of a data repetition 230 is a zero and the probability the bit of the data repetition 230 is a one. For the data repetition 230-a, the data repetition 230 may be defined by an intrinsic LLR vector containing M bits, $LLR_{D1}=[L_{1,1}, L_{1,2}, \ldots, L_{1,k}, \ldots, L_{1,M}]$, where each position k of the LLR vector may correspond to the LLR of a bit of the data repetition 230-a. For the data repetition 230-b, the data repetition 230 may be defined by an intrinsic LLR vector containing M bits, $LLR_{D2}=[L_{2,1}, L_{2,2}, \ldots, L_{2,k}, \ldots, L_{2,M}]$. For each of the data repetitions 230, the UE 115-a may compare $L_{1,k}$ to $L_{2,k}$ for all bits k (e.g., the UE 115-a may compare each bit of the data repetition 230-a to each bit of the data repetition 230-b). Given an optimizable positive parameter threshold, τ, which may be based on a history of communications, SRS measurements, or a CSI report, and if the signs of each LLR for each bit k of the data repetitions 230 are equal to each other, the UE 115-a may compare ratio of the absolute value LLRs for each bit k to the parameter threshold t to determine the how to combine the LLRs of the data repetitions 230.

As such, the instructions for combining the LLR vectors into a combined LLR vector when the LLRs of the bits between data repetitions 230 may be different or the same sign may be defined according to one or more rules. For example, if $$\text{sign}(L_{1,k}) \neq \text{sign}(L_{2,k})$$

and $$\frac{|L_{1,k}|}{|L_{2,k}|} \geq \tau,$$

the UE 115-a may not combine the LLR of position k and may select $L_{1,k}$ as the LLR at position k of the combined LLR vector. If $$\text{sign}(L_{1,k}) \neq \text{sign}(L_{2,k})$$

and $$\frac{|L_{1,k}|}{|L_{2,k}|} < \tau,$$

the UE 115-a may add together both LLRs and the updated LLR at position k of the combined LLR vector may be $L_{1,k}+L_{2,k}$. If $\text{sign}(L_{1,k})=\text{sign}(L_{2,k})$, the UE 115-a may add together both LRRs and the updated LLR at position k of the combined LLR vector may be $L_{1,k}+L_{2,k}$. As such, when combining data repetition 230-a and data repetition 230-b, the UE 115-a may compare each bit of the data repetitions 230 to generate a combined data repetition 230 with the combined LLR vector to be decoded at the decoder 215.

In some examples, when the UE 115-a may use a combining coefficient, a, to combine the LLRs at a position k of the LRR vectors. For example, when combining the LLRs for a bit k as described herein, the UE 115-a may combine the LLRs using the combining coefficient such that, $\alpha L_{1,k}+(1-\alpha)L_{2,k}$. Moreover, when the UE 115-a combines the LLLR vectors for the two different data repetitions 230, they UE 115-b may be combine the LLR vectors using the combining coefficient such that, $\alpha LLR_{D1}+(1-\alpha)LLR_{D2}$. In some cases, the network entity 105-a or the UE 115-a may configure the value of the combining coefficient, a, through SRS training. In some other cases, the UE 115-a and the network entity may negotiate the value of the combining coefficient, α, based on previous communications (e.g., previously received PDSCH communications on the same QCL beams, CSI measurements, SRS measurements, or any combination thereof).

In such examples described herein, the first demodulator 220-a and the second demodulator 220-b may operate concurrently. However, operating the demodulators 220 concurrently may cause a high level of power consumption for the UE 115-a. In cases where the UE 115-a may be a low powered device, running the demodulators 220 concurrently may consume too much power for the UE 115-a to successfully decode the data repetitions 230. As such, in some cases, the UE 115-a may run the demodulators 220 sequentially to reduce power consumption at the UE 115-a and use cyclic redundancy check (CRC)-based combining.

When sequentially running the demodulators 220, the UE 115-a may receive the data repetition 230-a via the first set of antenna elements 250-a, and the UE 115-a may demodulate the data repetition using the first demodulator 220-a at a first time. The UE 115-a may also receive the data repetition 230-b via the second set of antenna elements 250-b, at the same time as receiving the data repetition 230-a, and the UE 115-a may demodulate the data repetition 230-b using the second demodulator 220-b at a second time. In some cases, if the UE 115-a transmits the SRS measurements for a beamforming configuration using the first set of antenna elements 250-a, the network entity 105-a may configure the beamforming configuration parameters based on the SRS measurements from the first set of antenna elements 250-a. As such, the network entity 105-a may select an MCS, a PMI, a rank indicator (RI), and other transmission parameters based on the SRS measurements from the first set of antenna elements 250-a. In such examples, the second set of antenna elements 250-a may refrain from transmitting SRS measurements as the transmission parameters may have the network entity 105-a may have already configured the parameters using the SRS measurements from the first set of antenna elements 250-a. Therefore, the beamforming configuration between the UE 115-a and the network entity 105-a may be based on the first set of antenna elements 250-a and not the second set of antenna elements 250-b. As such, the first set of antenna elements 250-a may be referred to as sounded receiving antenna elements 250 and the second set of antenna elements 250-a may be referred to as unsounded receiving antenna elements 250.

In such cases, the UE 115-a may run the first demodulator 220-a on the data repetition 230-a received via the first set of antenna elements 250-a (e.g., the sounded receiving antenna elements 250) and run the decoder 215 on the data repetition 230-a at the first time. The UE 115-a may run a CRC on the decoded data repetition 230-a and if the CRC passes, the UE 115-a may transmit an ACK via the feedback message 235. The CRC may be a technique used to check for errors in the decoded data repetition 230. For example, the data repetition may have a set of check bits appended to the end of the data, and the UE 115-a may check the check bits for an error to determine if the CRC fails. If the CRC fails (e.g., there was an error in one or more of the check bits of the data repetition 230-a), the UE 115-a may run the second demodulator 220-b on the data repetition 230-b received via the second set of antenna elements 250-b (e.g., the unsounded receiving antenna elements 250) and run the decoder 215 on the data repetition 230-b at the second time. The UE 115-a may run the CRC on the decoded data repetition 230-b and if the CRC passes the UE 115-a may transmit an ACK via the feedback message 235. If the CRC fails, the UE 115-a may combine the data repetition 230-a and the data repetition 230-b at a third time. In some cases, the UE 115-a may combine the decoded data repetition 230-a and the decoded data repetition 230-b which both initially failed the CRC and check the CRC without running the decoder 215 an additional time, therefore saving processing power.

In some other cases, the UE 115-a may run the decoder 215 on the combined decoded data repetition 230 for a quantity of iterations and perform a CRC. In some examples, the UE 115-a may run the decoder 215 a reduced quantity of iterations since the UE 115-a has decoded both data repetitions 230 previously (e.g., at the first time and the second time). Additionally, or alternatively, the UE 115-a may disregard the decoded data repetitions 230, combine the initial (e.g., non-decoded) data repetition 230-a and the initial data repetition 230-b, run the decoder on the combined data repetition 230, and perform a CRC. In such cases, if the CRC fails on the combined data repetition 230, the UE 115-a may transmit a NACK via the feedback message 235 indicating a failure to decode the data repetitions 230.

Combining the data repetitions 230 prior to decoding, or decoding using the decoding order, as indicated via the assistance information 225, may reduce the complexity and power consumption of the UE 115-a when decoding at the data repetitions 230. For example, using such techniques described herein may reduce the complexity and power consumption of operating the decoder 215 as the UE 115-a may run the decoder 215 on the combined data repetitions 230 opposed to running the decoder 215 on individual and combined data repetitions 230. Additionally, or alternatively, combining the data repetitions 230 or decoding using the decoding order, as indicated via the assistance information 225, may reduce the latency and delay of decoding data repetitions 230. Techniques for transmitting and receiving the assistance information 225 and decoding the data repetitions 230 may be described in further detail elsewhere herein, including with reference to FIG. 3.

Figure 3:
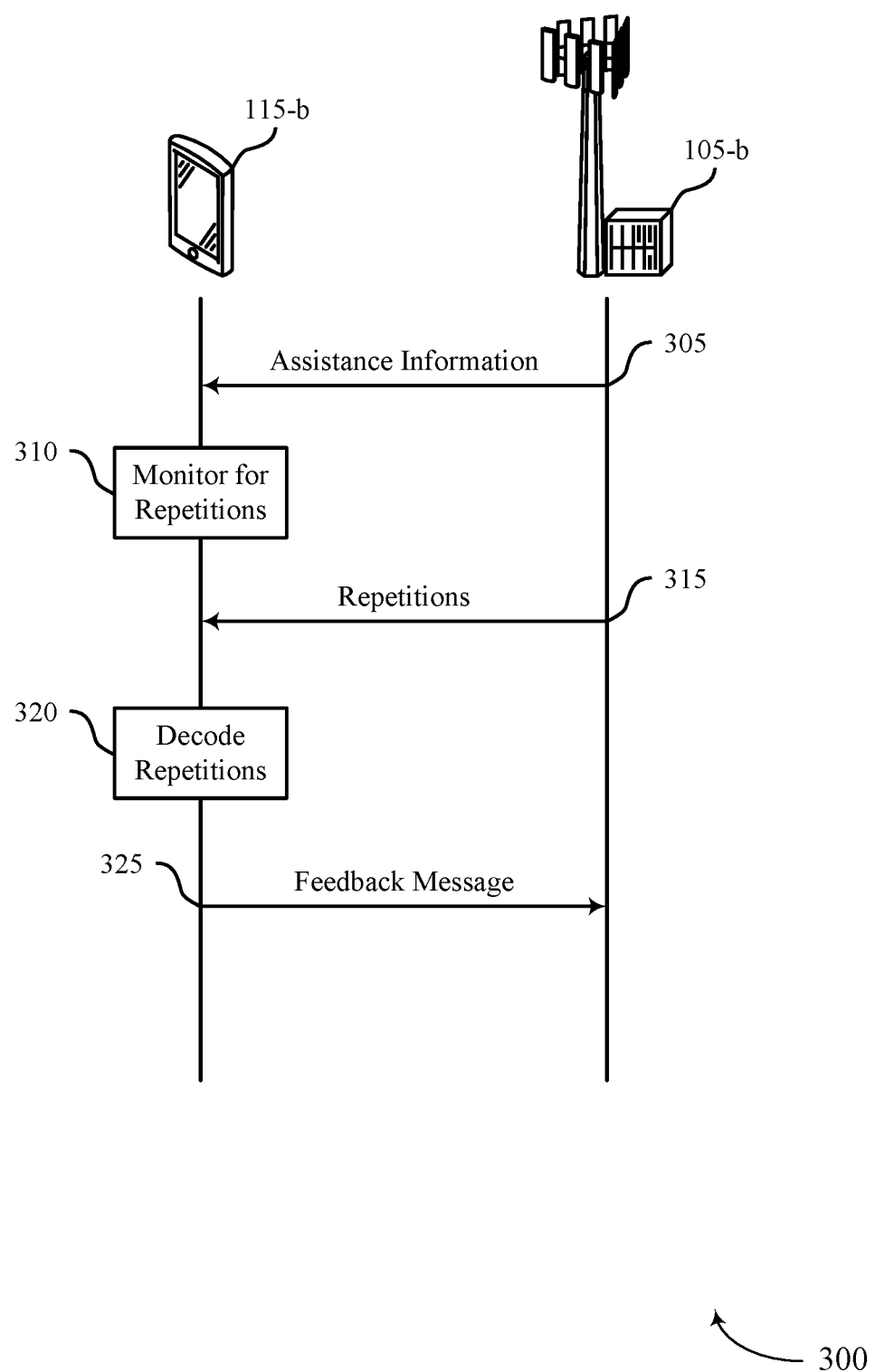
FIG. 3 illustrates an example of a process flow that supports network entity assisted decoding for repetition-based transmissions in accordance with one or more aspects of the present disclosure.

FIG. 3 illustrates an example of a process flow 300 that supports network entity assisted decoding for repetition-based transmissions in accordance with one or more aspects of the present disclosure. In some examples, the process flow 300 may implement or be implemented by the wireless communication system 100 and/or 200. For example, the process flow 300 may include a UE 115-b and a network entity 105-b, which may represent examples of corresponding devices described herein.

In the following description of the process flow 300, the operations between the UE 115-b and the network entity 105-b may be performed in different orders or at different times. Some operations may also be left out of the process flow 300, or other operations may be added. Although the UE 115-b and the network entity 105-b are shown performing the operations of the process flow 300, some aspects of some operations may also be performed by one or more other wireless devices. For example, the operations may also be performed by two UEs for sidelink communications, or any other wireless devices.

At 305, the UE 115-b may receive a message from the network entity 105-b indicating assistance information for the UE 115-b to decode a first set of repetitions of a data transmission. The assistance information may include a decoding order for the first set of repetitions, iteration instructions indicating a quantity of decoder iterations to run on the first set of repetitions, or both. In some cases, the UE 115-b may also receive an indication, via the assistance information from the network entity 105-b, of a threshold quantity of repetitions. One or more repetitions of the first set of repetitions may include the threshold quantity of repetitions. Additionally, or alternatively, the UE 115-b may receive an indication, via the assistance information from the network entity 105-b, of an index value for decoding the one or more of the repetitions of the data transmission. In some examples, the index value may be based on a time-frequency resource location of the one or more repetitions or a repetition index of the first set of repetitions. The index value may point to a specific repetition of the first set of repetitions and indicating that UE 115-b should decode the first set of repetitions starting from the index value. In some other cases, the UE 115-b may receive an indication, via the assistance information from the network entity 105-b, of an RV sequency for an RV patten and the decoding order. In some examples, the UE 115-a may receive the one or more repetitions in accordance with the RV sequency.

In some cases, the UE 115-b may receive the assistance information from the network entity 105-b based on a power change or state change (e.g., TCI state change) at the network entity 105-b. The assistance information may indicate for the UE 115-b to run the decoder for a threshold quantity of iterations on a repetition of the one or more repetitions and combine the LLRs with the remaining one or more repetitions.

In some examples, the assistance information may be based on a priority of the data transmission, a QoS of the data transmission, a latency of the data transmission, or any combination thereof. That is, the assistance information may indicate the decoding order or decoder iteration instructions based on the priority, QoS, or latency of the data transmission. In some cases, the message indicating the assistance information may be dedicated to the decoding order, the decoder iteration instructions, or both. In some other cases, in conjunction with the message from the network entity 105-b, indicating assistance information, the message may also schedule a downlink shared channel repetition (e.g., PDSCH repetition).

At 310, the UE 115-b may monitor for the one or more repetitions of the first set of repetitions. At 315, the network entity 105-b, may transmit the one or more repetitions of the first set of repetitions to the UE 115-b. In some cases, the repetitions may be repetitions of a data transmission, a transport block, or a repetition of some other information. Additionally, or alternatively, the UE 115-b may receive one or more repetitions from the network entity 105-b via a PDCCH, a PDSCH, or any other type of downlink channel.

In some cases, the UE 115-*b* may receive the one or more repetitions from one or more TRPs of the wireless communication system (e.g., the wireless communication system 100 or the wireless communication system 200 as described in FIGS. 1-2). In some examples, the UE 115-*b* may receive the one or more repetitions, from the network entity 105-*b* or one or more TRPs, on one or more groups of antenna elements of an antenna panel at the UE 115-*b*. In such examples, the UE 115-*b* may receive a single data transmission via the antenna panel and the one or more groups of antenna elements may each receive the data transmission. In some cases, the UE 115-*b* may interpret the one or more groups of antenna elements receiving the single data transmission as the one or more repetitions of the data transmission.

At 320, the UE 115-*b* may decode the one or more data repetitions of the first set of data repetitions based on the assistance information from the network entity 105-*b* at 305. In some examples, the UE 115-*b* may decode the one or more repetitions after receiving the threshold quantity of repetitions. In some cases, the UE 115-*b* may decode the one or more repetitions starting at the index value received via the assistance information, at 305. In some other cases, the UE 115-*b* may decode the one or more repetitions in accordance to the RV pattern and the decoding order received via the assistance information, at 305. Additionally, or alternatively, the UE 115-*b* may decode the one or more repetitions in accordance with the decoder iteration instructions. For example, the UE 115-*b* may iterate the decoder on the one or more repetitions as indicated via the decoder iteration instructions.

In some examples, the UE 115-*b* may selectively combine the respective LLRs of the one or more repetitions. The UE 115-*b* may combine the LLRs based on a first comparison of the LLRs associated with the one or more repetitions, a second comparison of the LLRs associated with the one or more repetitions and a parameter, or both. For example, the first comparison may be whether the LLRs are the same sign, and the second comparison may be whether the ratio of the absolute value of the LLRs is greater than or equal to, or less than the parameter (e.g., a threshold parameter). Based on the first comparison and the second comparison the UE 115-*b* may determine whether to combine the LLRs of the one or more repetitions. In some cases, the UE 115-*b* may determine a coefficient for combining respective LLRs associated with the one or more repetitions. The coefficient may be determined based on prior data transmissions on the same beam as the data transmission, a CSI report or CSI measurements, SRS measurements, or any combination thereof. As such, the UE 115-*b* may decode the one or more repetitions based on combining the respective LLRs and the coefficient.

In some examples, the UE 115-*b* may demodulate, via a first demodulator, a repetition of the one or more repetitions to obtain a first demodulated signal of the data transmission and a first LLR of the repetition. Following, the UE 115-*b* may demodulate the repetition, via a second demodulator, to obtain a second demodulated signal of the data transmission and a second LLR of the repetition, based on a first CRC of the first demodulated signal. For example, if the CRC fails on the first demodulated signal, the UE 115-*b* may demodulate the repetition at the second demodulator. Based on a second CRC (e.g., the second CRC failing), the UE 115-*b* may combine the first LLR and the second LLR. As such, decoding the one or more repetitions may be based on demodulating the repetition at the first demodulator, the second demodulator, or combining the first LLR and the second LLR. In some examples, the UE 115-*b* may combine the first LLR and the second LLR from the first demodulated signal and the second demodulated signal respectively, and refrain from decoding the combined repetition. In some other examples, the UE 115-*b* may decode the combined repetition including the first LLR and the second LLR or the UE 115-*b* may combine the repetitions prior to demodulating the repetition. In some cases, the UE 115-*b* may refrain from demodulating the repetition at the second demodulator and refrain from combining the first LLR and the second LLR based on a successful demodulation of the repetition at the first demodulator. In some other cases, the UE 115-*b* may refrain from combining the first LLR and the second LLR based on a successful demodulation of the repetition at the second demodulator.

In some cases, the UE 115-*a* may transmit a CSI report to the network entity 105-*b* based on combining a second set of repetitions in accordance with at least one decoder iteration of a repetition of the second set of repetitions. In some examples, the second set of repetitions may be related to a first set of transmission parameters. The UE 115-*b* may receive a second set of transmission parameters from the network entity 105, the second set of transmission parameters may be related to the first set repetitions. In some examples, the UE 115-*b* may decode the one or more repetitions of the first set of repetitions in accordance with the second set of transmission parameters. The first set of transmission parameters and the second set of transmission parameters may include a MCS, a rank parameter, a power control parameter, a beamforming parameter, a TRP panel parameter, a quantity of repetitions, or any combination thereof.

At 325, the UE 115-*b* may transmit a feedback message to the network entity 105-*b* based on decoding the one or more repetitions of the first set of repetitions or iterating the decoder on the one or more repetitions in accordance with the assistance information, received from the network entity 105-*b* at 305. In some cases, the feedback message may indicate a successful demodulation of a repetition of the one or more repetitions at the first demodulator or the second demodulator. In some other cases, the feedback message may indicate a successful demodulation of the repetition of the one or more repetition based on a third CRC, associated with combining the first LLR and the second LLP passing. In some examples, the feedback message may indicate a failed demodulation of the repetition of the one or more repetitions based on a third CRC check associated with combining the first LLR and the second LLR failing. As such, the feedback message may indicate to the network entity 105-*b* whether the UE 115-*a* has successfully decoded the repetitions from the network entity 105-*b* based on the assistance information from the network entity 105-*b*.

Figure 4:
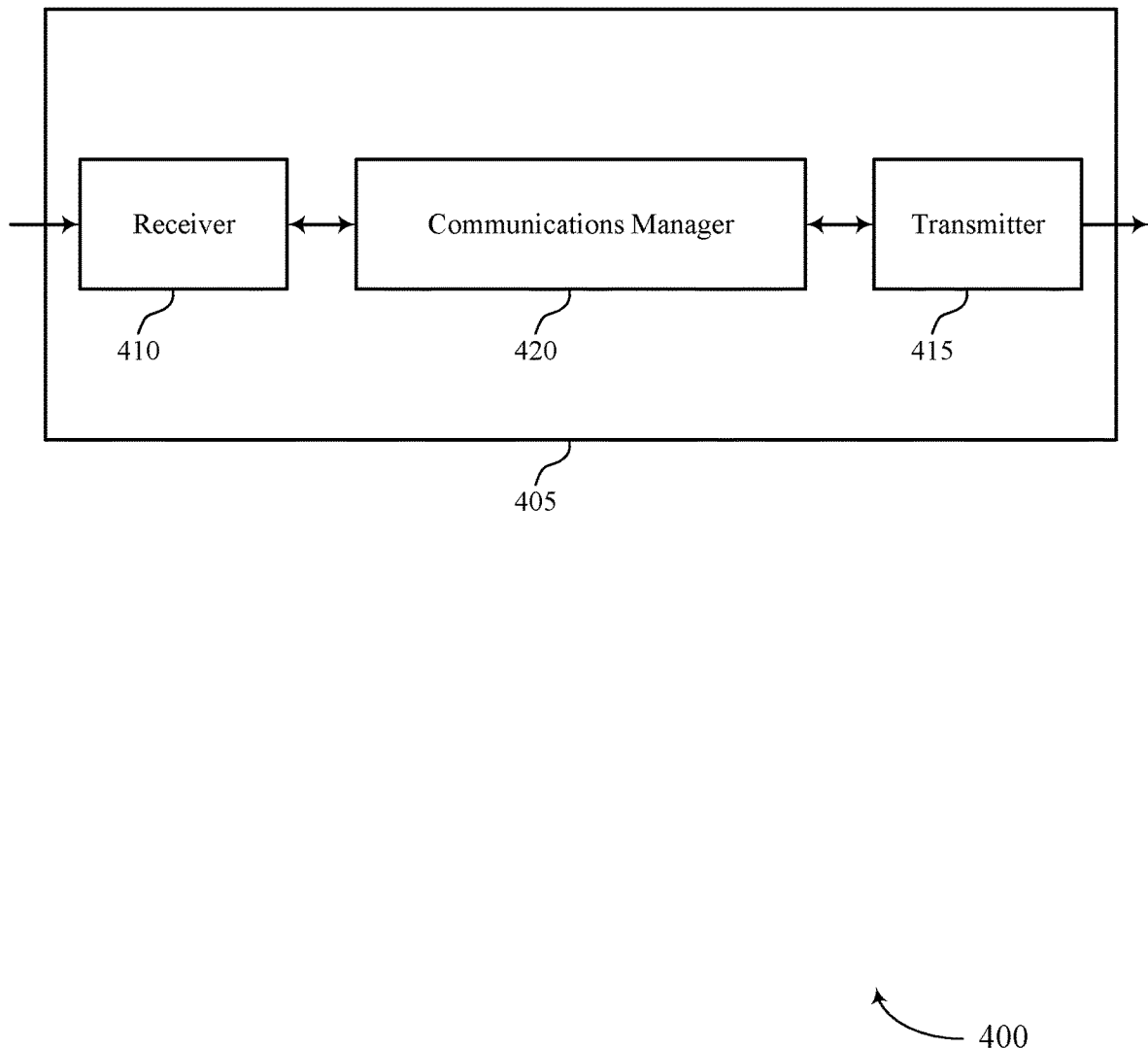
FIGS. 4 and 5 illustrate block diagrams of devices that support network entity assisted decoding for repetition-based transmissions in accordance with one or more aspects of the present disclosure.

FIG. 4 illustrates a block diagram 400 of a device 405 that supports network entity assisted decoding for repetition-based transmissions in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to network entity assisted decoding for repetition-based transmissions). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to network entity assisted decoding for repetition-based transmissions). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of network entity assisted decoding for repetition-based transmissions as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

For example, the communications manager 420 may be configured as or otherwise support a means for receiving a message indicating a decoding order for the UE to decode a first set of multiple repetitions of a data transmission, iteration instructions indicating a quantity of iterations to perform on the first set of multiple repetitions, or a combination thereof. The communications manager 420 may be configured as or otherwise support a means for monitoring for one or more repetitions of the first set of multiple repetitions. The communications manager 420 may be configured as or otherwise support a means for transmitting a feedback message based on decoding the one or more repetitions of the first set of multiple repetitions or iterating the one or more repetitions of the first set of multiple repetitions in accordance with the decoding order, the iteration instructions, or any combination thereof.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for a UE to receive assistance information for decoding one or more repetitions, which may provide for reduced processing, reduced power consumption, and more efficient utilization of communication resources.

Figure 5:
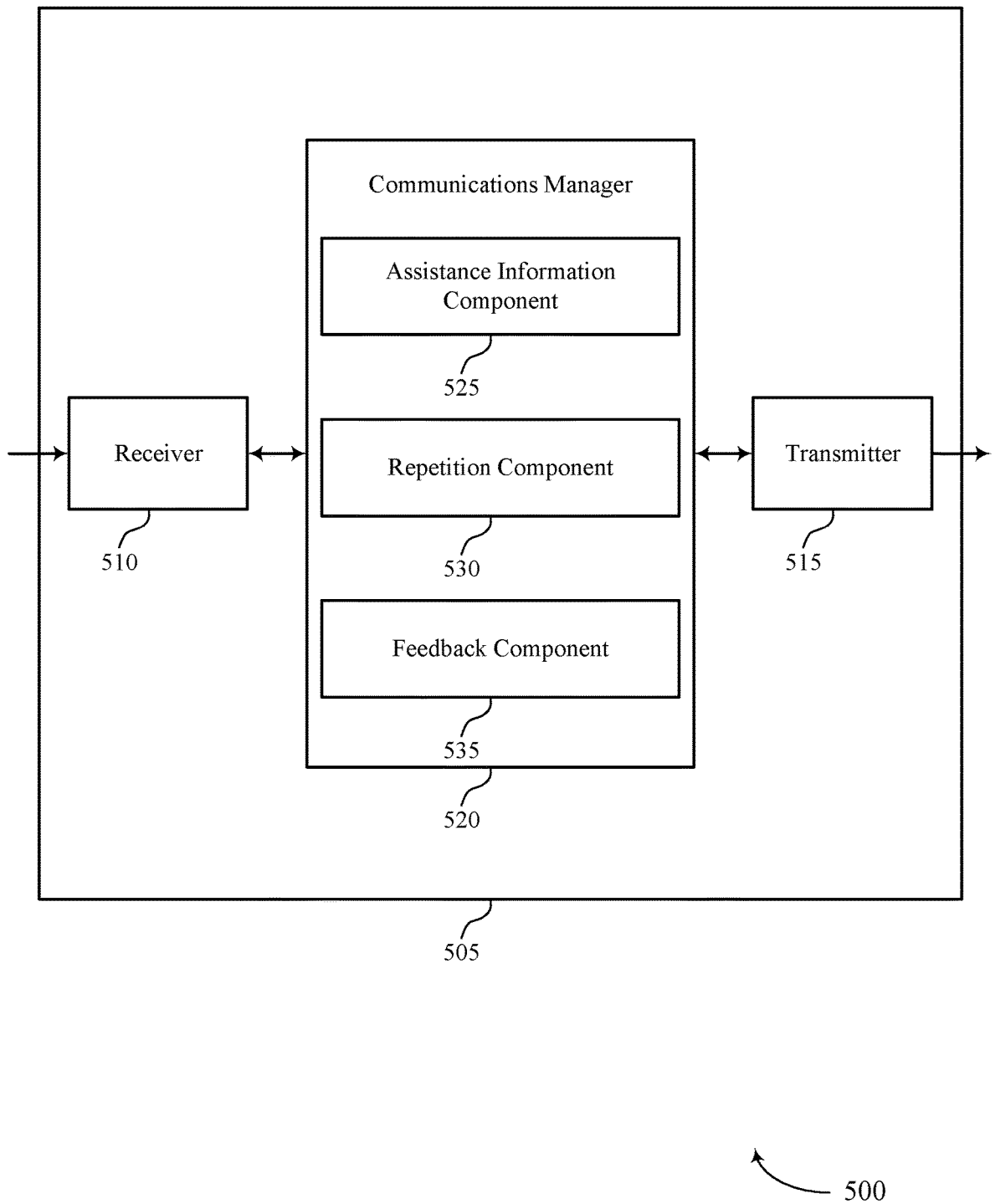

FIG. 5 illustrates a block diagram 500 of a device 505 that supports network entity assisted decoding for repetition-based transmissions in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to network entity assisted decoding for repetition-based transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to network entity assisted decoding for repetition-based transmissions). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of network entity assisted decoding for repetition-based transmissions as described herein. For example, the communications manager 520 may include an assistance information component 525, a repetition component 530, a feedback component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The assistance information component 525 may be configured as or otherwise support a means for receiving a message indicating a decoding order for the UE to decode a first set of multiple repetitions of a data transmission, iteration instructions indicating a quantity of iterations to perform on the first set of multiple repetitions, or a combination thereof. The repetition component 530 may be configured as or otherwise support a means for monitoring for one or more repetitions of the first set of multiple repetitions. The feedback component 535 may be configured as or otherwise support a means for transmitting a feedback message based on decoding the one or more repetitions of the first set of multiple repetitions or iterating the one or more repetitions of the first set of multiple repetitions in accordance with the decoding order, the iteration instructions, or any combination thereof.

Figure 6:
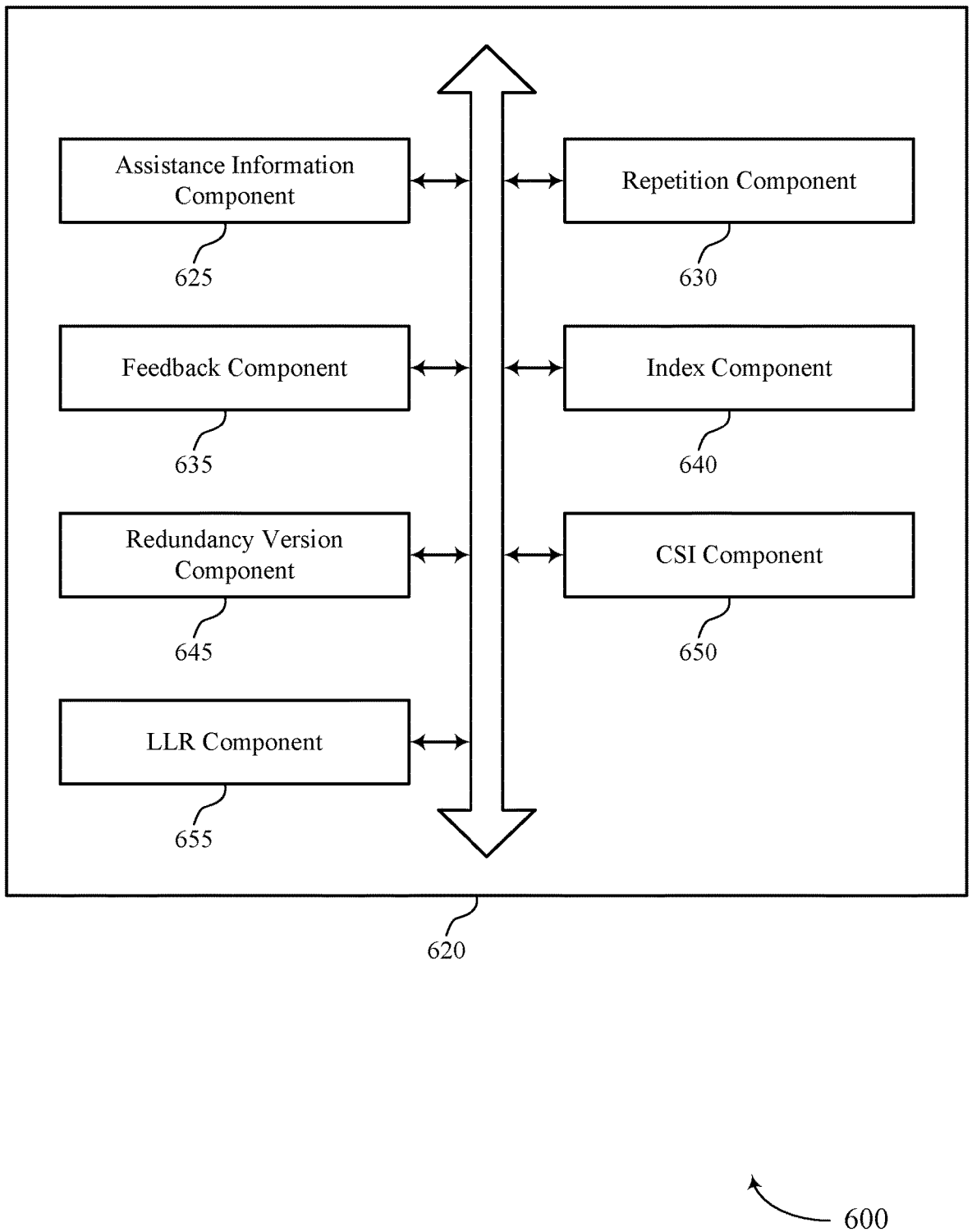
FIG. 6 illustrates a block diagram of a communications manager that supports network entity assisted decoding for repetition-based transmissions in accordance with one or more aspects of the present disclosure.

FIG. 6 illustrates a block diagram 600 of a communications manager 620 that supports network entity assisted decoding for repetition-based transmissions in accordance with one or more aspects of the present disclosure. The communications manager 620 may be an example of aspects of a communications manager 420, a communications manager 520, or both, as described herein. The communications manager 620, or various components thereof, may be an example of means for performing various aspects of network entity assisted decoding for repetition-based transmissions as described herein. For example, the communications manager 620 may include an assistance information component 625, a repetition component 630, a feedback component 635, an index component 640, a RV component 645, a CSI component 650, an LLR component 655, or any combination thereof. Each of these components may communicate, directly or indirectly, with one another (e.g., via one or more buses).

The assistance information component 625 may be configured as or otherwise support a means for receiving a message indicating a decoding order for the UE to decode a first set of multiple repetitions of a data transmission, iteration instructions indicating a quantity of iterations to perform on the first set of multiple repetitions, or a combination thereof. The repetition component 630 may be configured as or otherwise support a means for monitoring for one or more repetitions of the first set of multiple repetitions. The feedback component 635 may be configured as or otherwise support a means for transmitting a feedback message based on decoding the one or more repetitions of the first set of multiple repetitions or iterating the one or more repetitions of the first set of multiple repetitions in accordance with the decoding order, the iteration instructions, or any combination thereof.

In some examples, the assistance information component 625 may be configured as or otherwise support a means for receiving an indication of a threshold quantity of repetitions, where the one or more repetitions includes the threshold quantity of repetitions, and where the decoding order includes the threshold quantity of repetitions. In some examples, the repetition component 630 may be configured as or otherwise support a means for decoding the one or more repetitions after receiving the threshold quantity of repetitions.

In some examples, to support receiving the message, the index component 640 may be configured as or otherwise support a means for receiving an indication of an index value corresponding to decoding the one or more repetitions, where the index value is based on a time-frequency resource location of the one or more repetitions or a repetition index of the first set of multiple repetitions, and where the decoding order includes the index value. In some examples, to support receiving the message, the index component 640 may be configured as or otherwise support a means for decoding the one or more repetitions starting at the index value.

In some examples, the RV component 645 may be configured as or otherwise support a means for receiving an indication of a RV sequence corresponding to a RV pattern and the decoding order, where the one or more repetitions are received in accordance with the RV sequence. In some examples, the repetition component 630 may be configured as or otherwise support a means for decoding the one or more repetitions in accordance with the RV pattern and the decoding order.

In some examples, to support receiving the message, the assistance information component 625 may be configured as or otherwise support a means for receiving, based on at least one of a power change or a state change at a network entity, an indication for the UE to perform a threshold quantity of iterations on a repetition of the one or more repetitions and to combine the iterations with LLRs of remaining repetitions of the one or more repetitions, where decoding the one or more repetitions is in accordance with the indication, the iteration instructions including the indication.

In some examples, to support receiving the message, the CSI component 650 may be configured as or otherwise support a means for transmitting a CSI report based on combining a second set of multiple repetitions in accordance with at least one decoder iteration of a repetition of the second set of multiple repetitions, where the second set of multiple repetitions are associated with a first set of transmission parameters. In some examples, to support receiving the message, the repetition component 630 may be configured as or otherwise support a means for receiving a second set of transmission parameters associated with the first set of multiple repetitions, where decoding the one or more repetitions of the first set of multiple repetitions is in accordance with the second set of transmission parameters.

In some examples, the first set of transmission parameters and the second set of transmission parameters include an MCS, a rank parameter, a power control parameter, a beamforming parameter, a TRP panel parameter, a quantity of repetitions, or any combination thereof.

In some examples, the decoding order is based on a priority of the data transmission, a quality of service of the data transmission, a latency of the data transmission, or any combination thereof.

In some examples, the message schedules a downlink shared channel repetition.

In some examples, the message is dedicated to the decoding order, the iteration instructions, or both.

In some examples, the LLR component 655 may be configured as or otherwise support a means for selectively combining respective LLRs associated with the one or more repetitions based on a first comparison between the respective LLRs associated with the one or more repetitions, a second comparison between a ratio of the respective LLRs and a parameter, or both, where decoding the one or more repetitions is based on the selective combining of the respective LLRs.

In some examples, the LLR component 655 may be configured as or otherwise support a means for determining a coefficient for combining respective LLRs associated with the one or more repetitions based on a prior data transmission on a same beam as the data transmission, a CSI measurement, a SRS measurement, or any combination thereof, where decoding the one or more repetitions is based on combining the respective LLRs in accordance with the coefficient.

In some examples, the repetition component 630 may be configured as or otherwise support a means for demodulating, at a first demodulator associated with the UE, a repetition of the one or more repetitions to obtain a first demodulated signal corresponding to the data transmission and to obtain a first LLR. In some examples, the repetition component 630 may be configured as or otherwise support a means for selectively demodulating, at a second demodulator associated with the UE, the repetition of the one or more repetitions to obtain a second demodulated signal corresponding to the data transmission and to obtain a second LLR, where selectively demodulating the repetition is based on a first CRC of the first demodulated signal. In some examples, the LLR component 655 may be configured as or otherwise support a means for selectively combining the first LLR and the second LLR based on a CRC of the second demodulated signal, where decoding the one or more repetitions is based on at least one of demodulating the repetition at the first demodulator, selectively demodulating the repetition at the second demodulator, or selectively combining the first LLR and the second LLR.

In some examples, the feedback message indicates a successful demodulation of the repetition based on demodulating the repetition at the first demodulator.

In some examples, the repetition component 630 may be configured as or otherwise support a means for refraining from demodulating the repetition at the second demodulator and refraining from combining the first LLRs and the second LLRs based on the successful demodulation of the repetition.

In some examples, the feedback message indicates a successful demodulation of the repetition based on demodulating the repetition at the second demodulator.

In some examples, the LLR component 655 may be configured as or otherwise support a means for refraining from combining the first LLRs and the second LLRs based on the successful demodulation of the repetition.

In some examples, the feedback message indicates a successful demodulation of the repetition based on a third CRC associated with combining the first LLRs and the second LLRs passing.

In some examples, the feedback message indicates a failed demodulation of the repetition based on a third CRC associated with combining the first LLRs and the second LLR failing.

Figure 7:
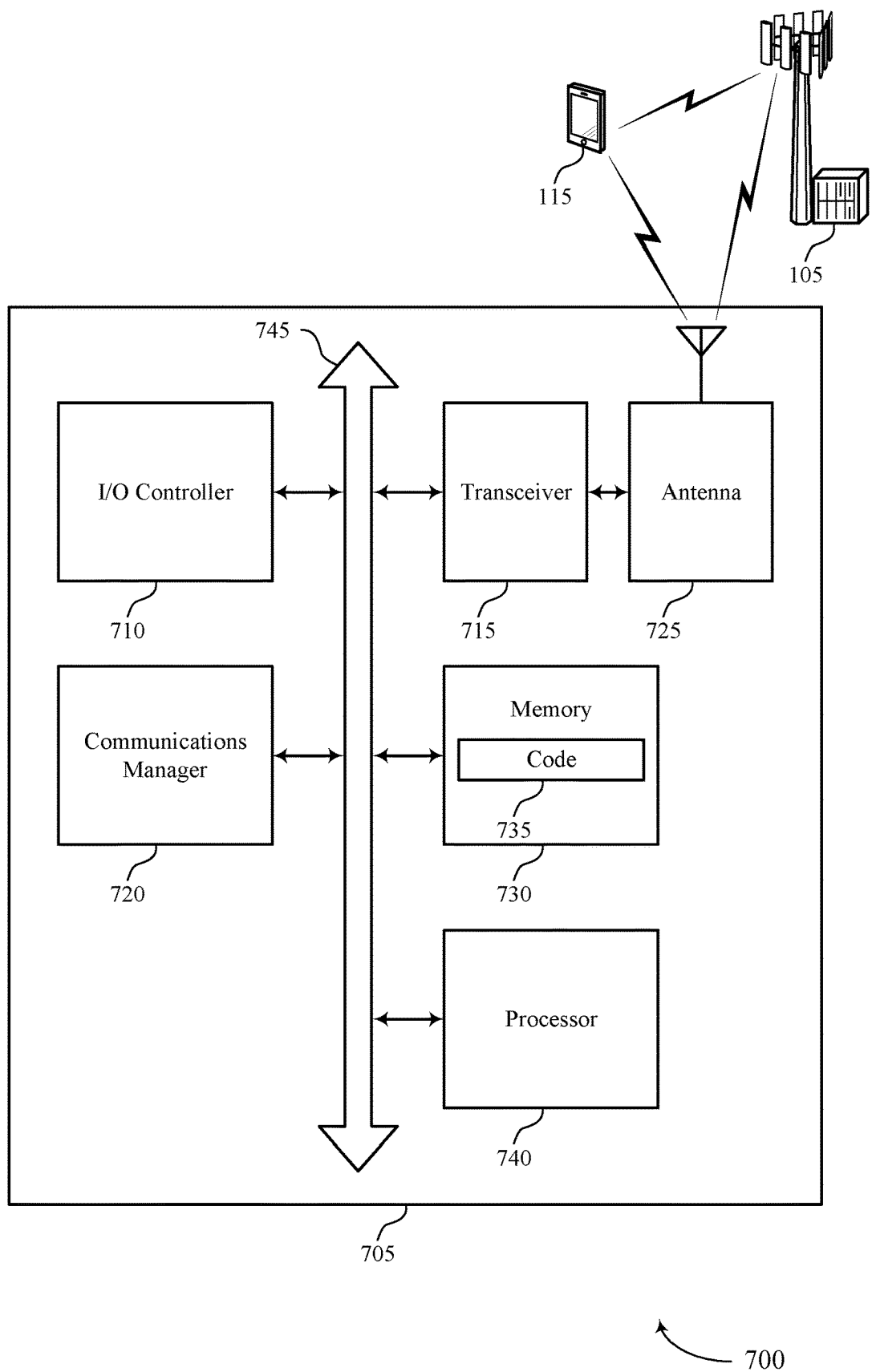
FIG. 7 illustrates a diagram of a system including a device that supports network entity assisted decoding for repetition-based transmissions in accordance with one or more aspects of the present disclosure.

FIG. 7 illustrates a diagram of a system 700 including a device 705 that supports network entity assisted decoding for repetition-based transmissions in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting network entity assisted decoding for repetition-based transmissions). For example, the device 705 or a component of the device 705 may include a processor 740 and memory 730 coupled with or to the processor 740, the processor 740 and memory 730 configured to perform various functions described herein.

For example, the communications manager 720 may be configured as or otherwise support a means for receiving a message indicating a decoding order for the UE to decode a first set of multiple repetitions of a data transmission, iteration instructions indicating a quantity of iterations to perform on the first set of multiple repetitions, or a combination thereof. The communications manager 720 may be configured as or otherwise support a means for monitoring for one or more repetitions of the first set of multiple repetitions. The communications manager 720 may be configured as or otherwise support a means for transmitting a feedback message based on decoding the one or more repetitions of the first set of multiple repetitions or iterating the one or more repetitions of the first set of multiple repetitions in accordance with the decoding order, the iteration instructions, or any combination thereof.

By including or configuring the communications manager 720 in accordance with examples as described herein, the device 705 may support techniques for a UE to receive assistance information for decoding one or more repetitions, which may provide for improved communication reliability, reduced latency, improved user experience related to reduced processing, reduced power consumption, more efficient utilization of communication resources, longer battery life, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of network entity assisted decoding for repetition-based transmissions as described herein, or the processor 740 and the memory 730 may be otherwise configured to perform or support such operations.

Figure 8:
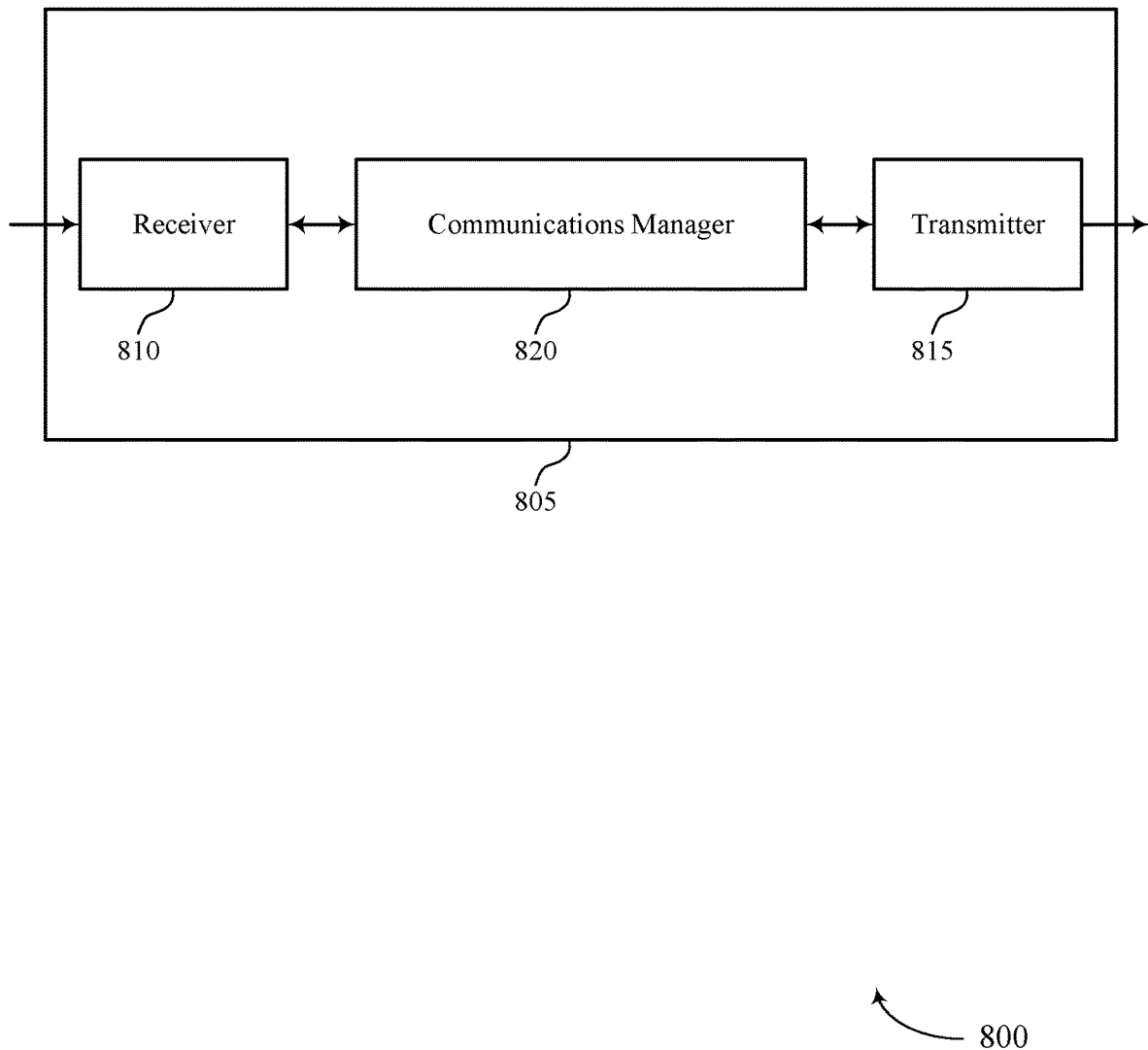
FIGS. 8 and 9 illustrate block diagrams of devices that support network entity assisted decoding for repetition-based transmissions in accordance with one or more aspects of the present disclosure.

FIG. 8 illustrates a block diagram 800 of a device 805 that supports network entity assisted decoding for repetition-based transmissions in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of network entity assisted decoding for repetition-based transmissions as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network entity in accordance with examples as disclosed herein. For example, the communications manager 820 may be configured as or otherwise support a means for transmitting a message indicating a decoding order for a UE to decode a first set of multiple repetitions of a data transmission, iteration instructions indicating a quantity of iterations to perform on the first set of multiple repetitions, or a combination thereof. The communications manager 820 may be configured as or otherwise support a means for transmitting one or more repetitions of the first set of multiple repetitions. The communications manager 820 may be configured as or otherwise support a means for receiving a feedback message corresponding to the one or more repetitions of the first set of multiple repetitions based on the message.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for a UE to receive assistance information for decoding one or more repetitions, which may provide for reduced processing, reduced power consumption, and more efficient utilization of communication resources.

Figure 9:
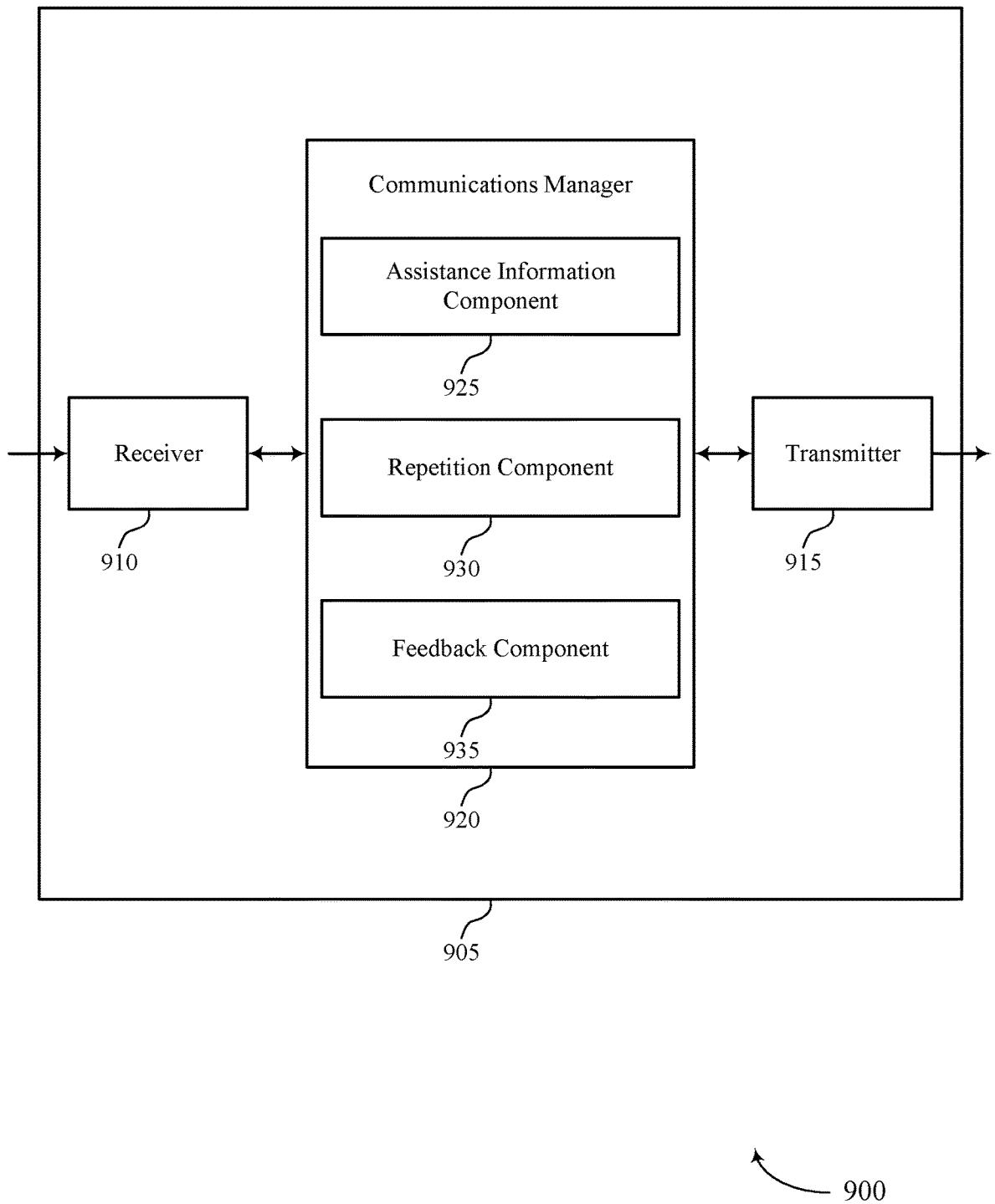

FIG. 9 illustrates a block diagram 900 of a device 905 that supports network entity assisted decoding for repetition-based transmissions in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of network entity assisted decoding for repetition-based transmissions as described herein. For example, the communications manager 920 may include an assistance information component 925, a repetition component 930, a feedback component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. The assistance information component 925 may be configured as or otherwise support a means for transmitting a message indicating a decoding order for a UE to decode a first set of multiple repetitions of a data transmission, iteration instructions indicating a quantity of iterations to perform on the first set of multiple repetitions, or a combination thereof. The repetition component 930 may be configured as or otherwise support a means for transmitting one or more repetitions of the first set of multiple repetitions. The feedback component 935 may be configured as or otherwise support a means for receiving a feedback message corresponding to the one or more repetitions of the first set of multiple repetitions based on the message.

Figure 10:
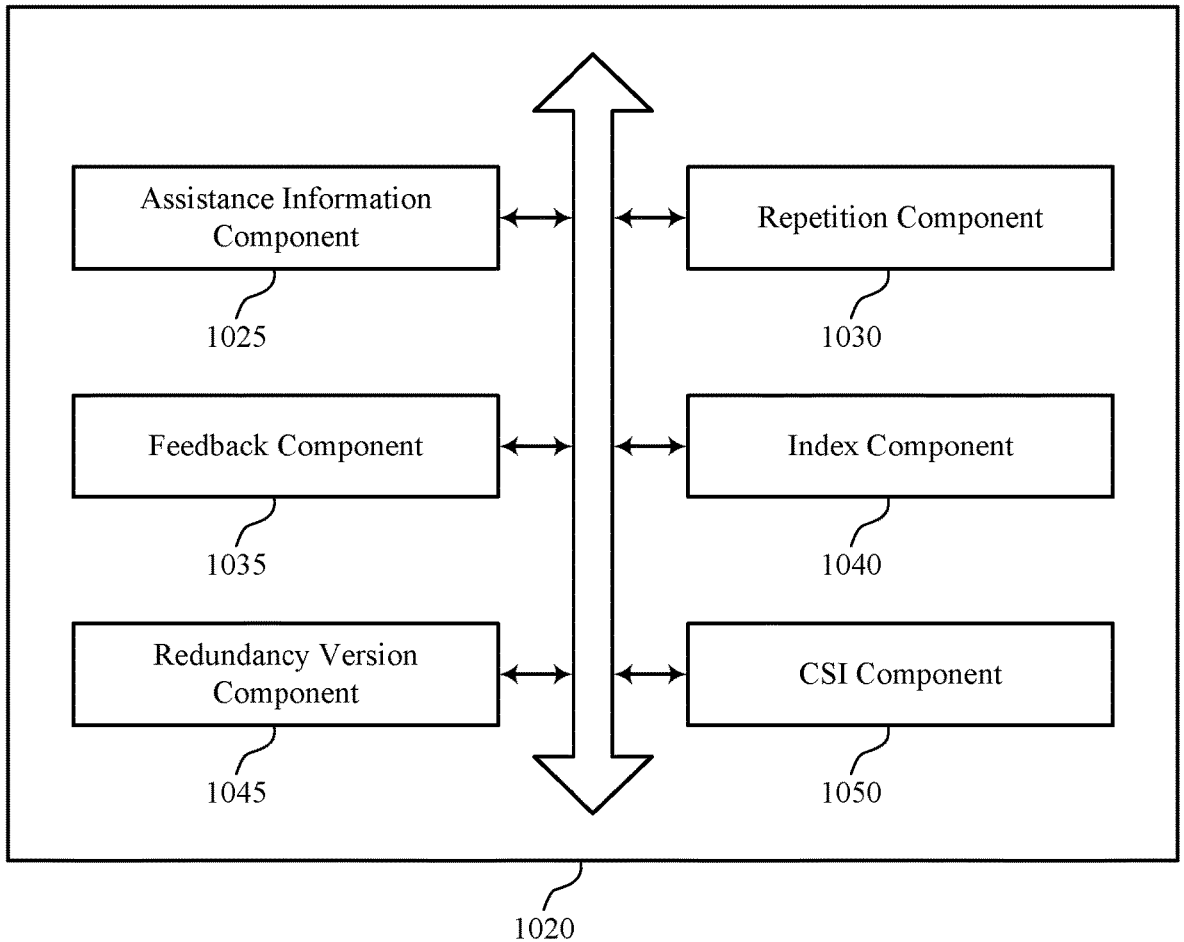
FIG. 10 illustrates a block diagram of a communications manager that supports network entity assisted decoding for repetition-based transmissions in accordance with one or more aspects of the present disclosure.

FIG. 10 illustrates a block diagram 1000 of a communications manager 1020 that supports network entity assisted decoding for repetition-based transmissions in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of network entity assisted decoding for repetition-based transmissions as described herein. For example, the communications manager 1020 may include an assistance information component 1025, a repetition component 1030, a feedback component 1035, an index component 1040, a RV component 1045, a CSI component 1050, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a network entity in accordance with examples as disclosed herein. The assistance information component 1025 may be configured as or otherwise support a means for transmitting a message indicating a decoding order for a UE to decode a first set of multiple repetitions of a data transmission, iteration instructions indicating a quantity of iterations to perform on the first set of multiple repetitions, or a combination thereof. The repetition component 1030 may be configured as or otherwise support a means for transmitting one or more repetitions of the first set of multiple repetitions. The feedback component 1035 may be configured as or otherwise support a means for receiving a feedback message corresponding to the one or more repetitions of the first set of multiple repetitions based on the message.

In some examples, the assistance information component 1025 may be configured as or otherwise support a means for transmitting an indication of a threshold quantity of repetitions, where the one or more repetitions includes the threshold quantity of repetitions, and where the decoding order includes the threshold quantity of repetitions.

In some examples, to support transmitting the message, the index component 1040 may be configured as or otherwise support a means for transmitting an indication of an index value corresponding to decoding the one or more repetitions at the UE, where the index value is based on a time-frequency resource location of the one or more repetitions or a repetition index of the first set of multiple repetitions, and where the decoding order includes the index value.

In some examples, the RV component 1045 may be configured as or otherwise support a means for transmitting an indication of a RV sequence corresponding to a RV pattern and the decoding order, where the one or more repetitions are transmitted in accordance with the RV sequence.

In some examples, to support transmitting the message, the assistance information component 1025 may be configured as or otherwise support a means for transmitting, based on at least one of a power change or a state change at a network entity, an indication for the UE to perform a threshold quantity of iterations on a repetition of the one or more repetitions and to combine the iterations with LLRs of remaining repetitions of the one or more repetitions, the iteration instructions including the indication.

In some examples, to support transmitting the message, the repetition component 1030 may be configured as or otherwise support a means for transmitting a second set of multiple repetitions associated with a first set of transmission parameters. In some examples, to support transmitting the message, the CSI component 1050 may be configured as or otherwise support a means for receiving a CSI report based on the second set of multiple repetitions. In some examples, to support transmitting the message, the repetition component 1030 may be configured as or otherwise support a means for transmitting a second set of transmission parameters associated with the first set of multiple repetitions.

In some examples, the first set of transmission parameters and the second set of transmission parameters include an MCS, a rank parameter, a power control parameter, a beamforming parameter, a TRP panel parameter, a quantity of repetitions, or any combination thereof.

In some examples, the decoding order is based on a priority of the data transmission, a quality of service of the data transmission, a latency of the data transmission, or any combination thereof.

In some examples, the message schedules a downlink shared channel repetition.

In some examples, the message is dedicated to the decoding order, the iteration instructions, or both.

In some examples, the feedback message indicates a successful demodulation of the one or more repetitions.

In some examples, the feedback message indicates a failed demodulation of the one or more repetitions.

Figure 11:
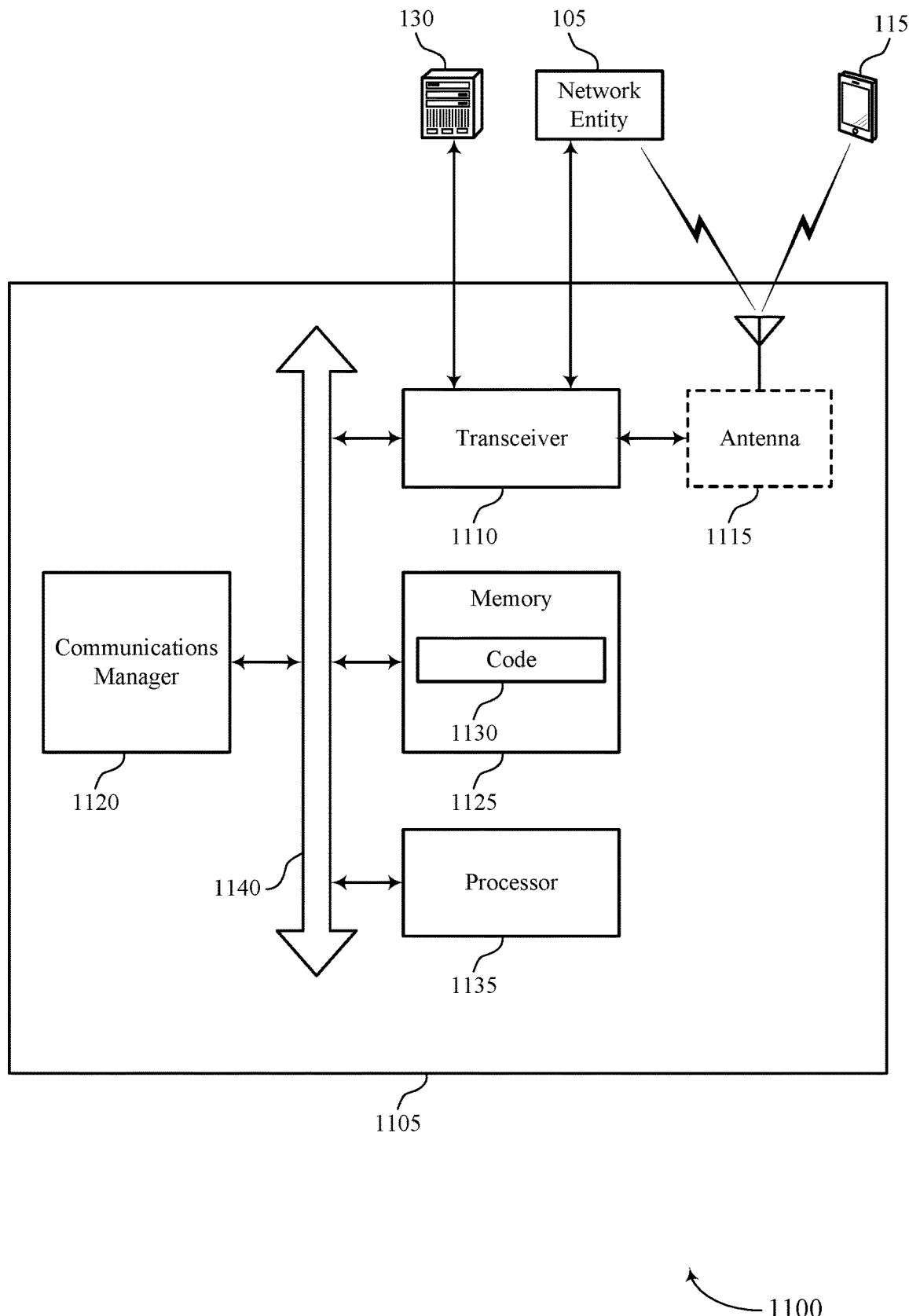
FIG. 11 illustrates a diagram of a system including a device that supports network entity assisted decoding for repetition-based transmissions in accordance with one or more aspects of the present disclosure.

FIG. 11 illustrates a diagram of a system 1100 including a device 1105 that supports network entity assisted decoding for repetition-based transmissions in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory.

In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting network entity assisted decoding for repetition-based transmissions). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a network entity in accordance with examples as disclosed herein. For example, the communications manager 1120 may be configured as or otherwise support a means for transmitting a message indicating a decoding order for a UE to decode a first set of multiple repetitions of a data transmission, iteration instructions indicating a quantity of iterations to perform on the first set of multiple repetitions, or a combination thereof. The communications manager 1120 may be configured as or otherwise support a means for transmitting one or more repetitions of the first set of multiple repetitions. The communications manager 1120 may be configured as or otherwise support a means for receiving a feedback message corresponding to the one or more repetitions of the first set of multiple repetitions based on the message.

By including or configuring the communications manager 1120 in accordance with examples as described herein, the device 1105 may support techniques for a UE to receive assistance information for decoding one or more repetitions, which may provide for improved communication reliability, reduced latency, improved user experience related to reduced processing, reduced power consumption, more efficient utilization of communication resources, longer battery life, and improved utilization of processing capability.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of network entity assisted decoding for repetition-based transmissions as described herein, or the processor 1135 and the memory 1125 may be otherwise configured to perform or support such operations.

Figure 12:
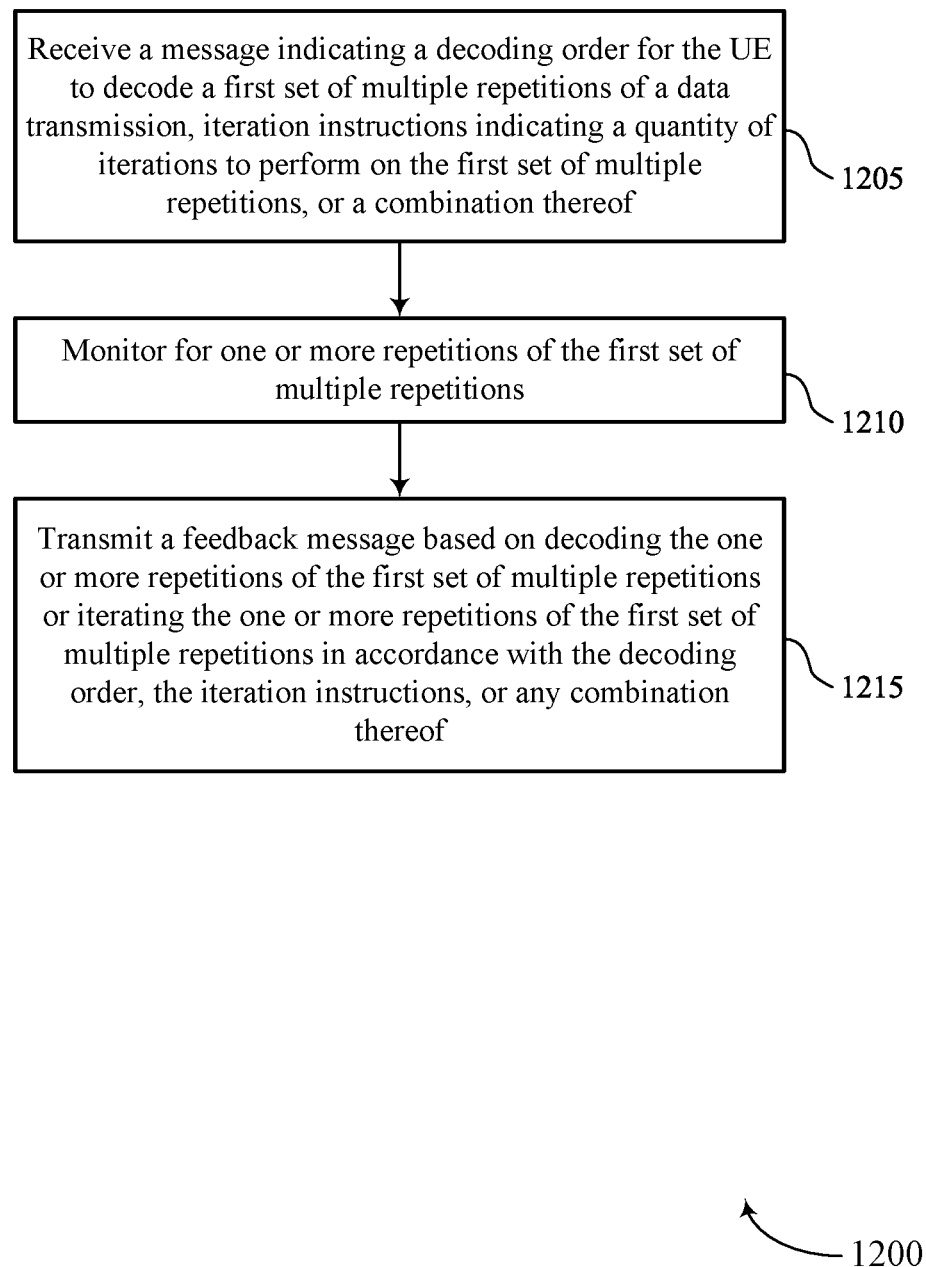
FIGS. 12 through 19 illustrate flowcharts showing methods that support network entity assisted decoding for repetition-based transmissions in accordance with one or more aspects of the present disclosure.

FIG. 12 illustrates a flowchart showing a method 1200 that supports network entity assisted decoding for repetition-based transmissions in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a message indicating a decoding order for the UE to decode a first set of multiple repetitions of a data transmission, iteration instructions indicating a quantity of iterations to perform on the first set of multiple repetitions, or a combination thereof. The operations of 1205 may be performed in accordance with examples as disclosed herein. In some examples, aspects of the operations of 1205 may be performed by an assistance information component 625 as described with reference to FIG. 6.

At 1210, the method may include monitoring for one or more repetitions of the first set of multiple repetitions. The operations of 1210 may be performed in accordance with examples as disclosed herein. In some examples, aspects of the operations of 1210 may be performed by a repetition component 630 as described with reference to FIG. 6.

At 1215, the method may include transmitting a feedback message based on decoding the one or more repetitions of the first set of multiple repetitions or iterating the one or more repetitions of the first set of multiple repetitions in accordance with the decoding order, the iteration instructions, or any combination thereof. The operations of 1215 may be performed in accordance with examples as disclosed herein. In some examples, aspects of the operations of 1215 may be performed by a feedback component 635 as described with reference to FIG. 6.

Figure 13:
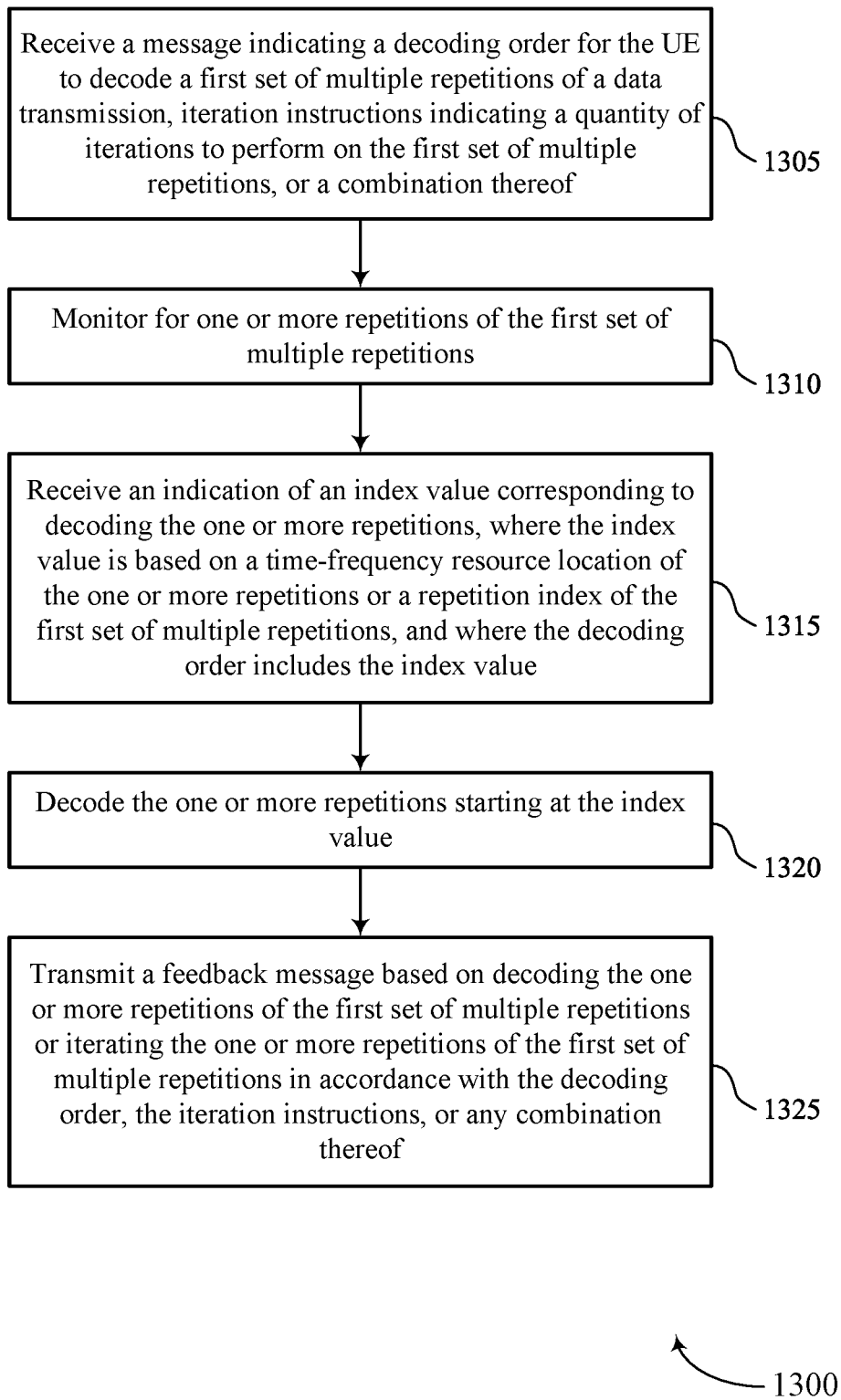

FIG. 13 illustrates a flowchart showing a method 1300 that supports network entity assisted decoding for repetition-based transmissions in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving a message indicating a decoding order for the UE to decode a first set of multiple repetitions of a data transmission, iteration instructions indicating a quantity of iterations to perform on the first set of multiple repetitions, or a combination thereof. The operations of 1305 may be performed in accordance with examples as disclosed herein. In some examples, aspects of the operations of 1305 may be performed by an assistance information component 625 as described with reference to FIG. 6.

At 1310, the method may include monitoring for one or more repetitions of the first set of multiple repetitions. The operations of 1310 may be performed in accordance with examples as disclosed herein. In some examples, aspects of the operations of 1310 may be performed by a repetition component 630 as described with reference to FIG. 6.

At 1315, the method may include receiving an indication of an index value corresponding to decoding the one or more repetitions, where the index value is based on a time-frequency resource location of the one or more repetitions or a repetition index of the first set of multiple repetitions, and where the decoding order includes the index value. The operations of 1315 may be performed in accordance with examples as disclosed herein. In some examples, aspects of the operations of 1315 may be performed by an index component 640 as described with reference to FIG. 6.

At 1320, the method may include decoding the one or more repetitions starting at the index value. The operations of 1320 may be performed in accordance with examples as disclosed herein. In some examples, aspects of the operations of 1320 may be performed by an index component 640 as described with reference to FIG. 6.

At 1325, the method may include transmitting a feedback message based on decoding the one or more repetitions of the first set of multiple repetitions or iterating the one or more repetitions of the first set of multiple repetitions in accordance with the decoding order, the iteration instructions, or any combination thereof. The operations of 1325 may be performed in accordance with examples as disclosed herein. In some examples, aspects of the operations of 1325 may be performed by a feedback component 635 as described with reference to FIG. 6.

Figure 14:
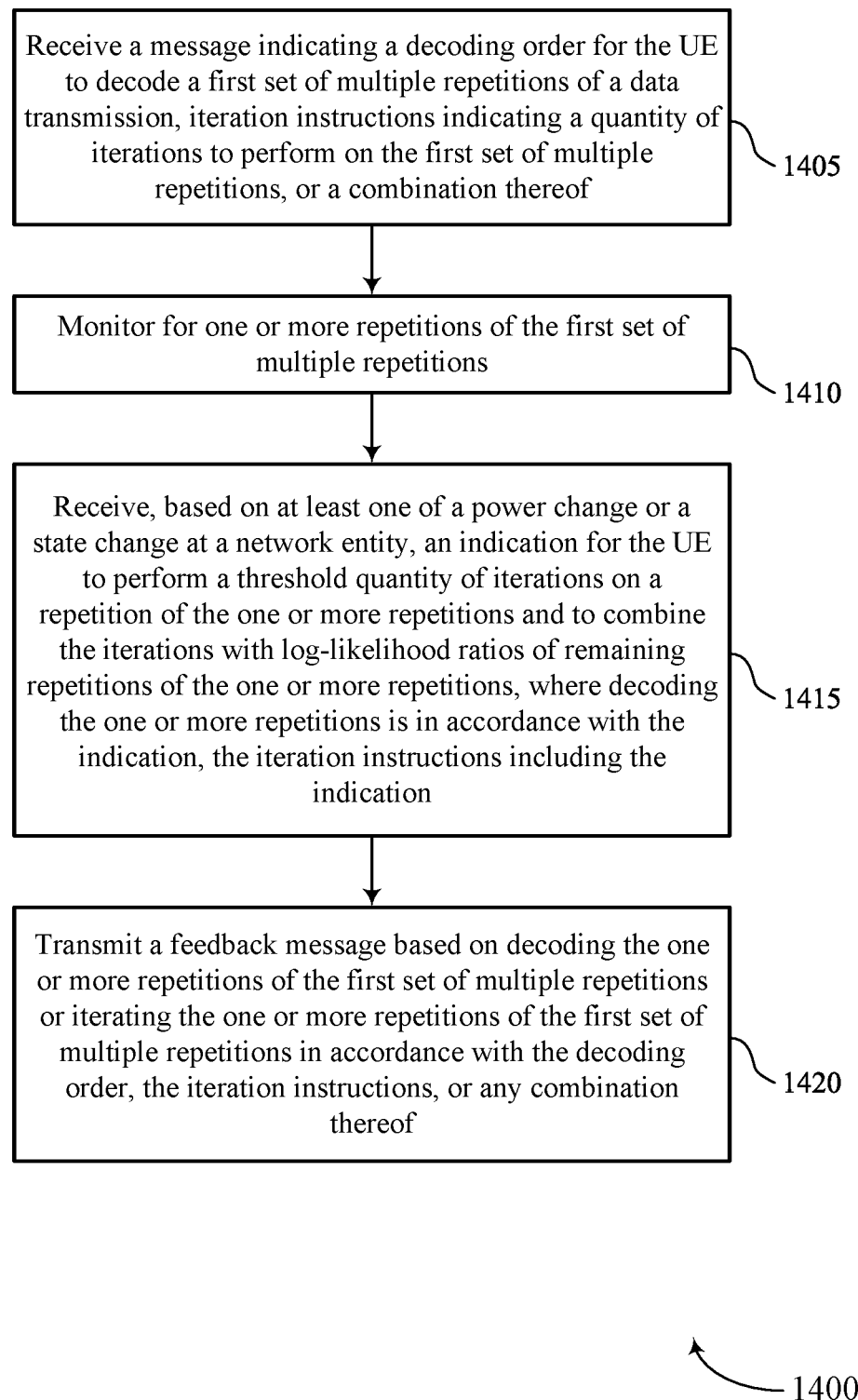

FIG. 14 illustrates a flowchart showing a method 1400 that supports network entity assisted decoding for repetition-based transmissions in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving a message indicating a decoding order for the UE to decode a first set of multiple repetitions of a data transmission, iteration instructions indicating a quantity of iterations to perform on the first set of multiple repetitions, or a combination thereof. The operations of 1405 may be performed in accordance with examples as disclosed herein. In some examples, aspects of the operations of 1405 may be performed by an assistance information component 625 as described with reference to FIG. 6.

At 1410, the method may include monitoring for one or more repetitions of the first set of multiple repetitions. The operations of 1410 may be performed in accordance with examples as disclosed herein. In some examples, aspects of the operations of 1410 may be performed by a repetition component 630 as described with reference to FIG. 6.

At 1415, the method may include receiving, based on at least one of a power change or a state change at a network entity, an indication for the UE to perform a threshold quantity of iterations on a repetition of the one or more repetitions and to combine the iterations with LLRs of remaining repetitions of the one or more repetitions, where decoding the one or more repetitions is in accordance with the indication, the iteration instructions including the indication. The operations of 1415 may be performed in accordance with examples as disclosed herein. In some examples, aspects of the operations of 1415 may be performed by an assistance information component 625 as described with reference to FIG. 6.

At 1420, the method may include transmitting a feedback message based on decoding the one or more repetitions of the first set of multiple repetitions or iterating the one or more repetitions of the first set of multiple repetitions in accordance with the decoding order, the iteration instructions, or any combination thereof. The operations of 1420 may be performed in accordance with examples as disclosed herein. In some examples, aspects of the operations of 1420 may be performed by a feedback component 635 as described with reference to FIG. 6.

Figure 15:
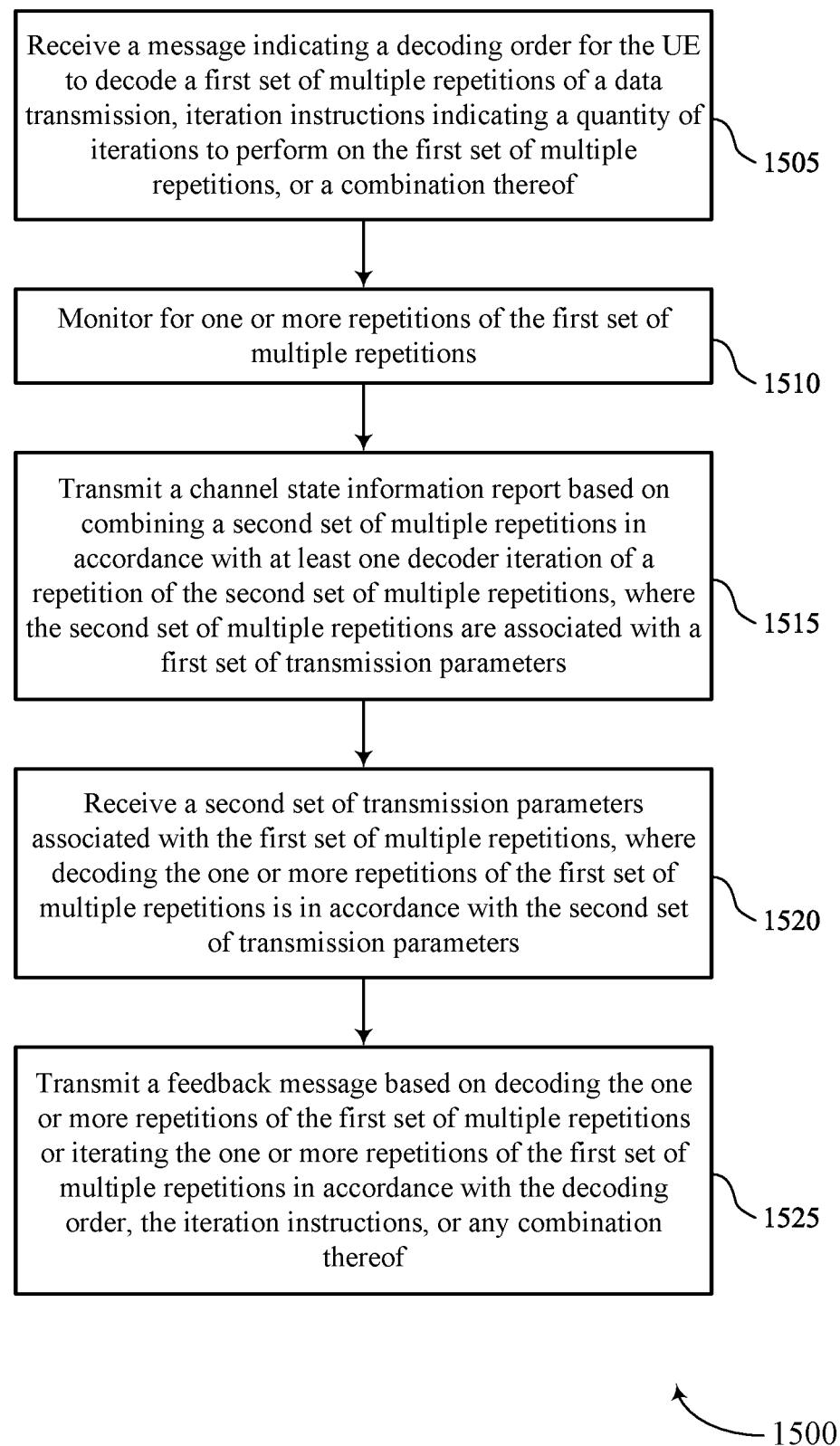

FIG. 15 illustrates a flowchart showing a method 1500 that supports network entity assisted decoding for repetition-based transmissions in accordance with one or more aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1505, the method may include receiving a message indicating a decoding order for the UE to decode a first set of multiple repetitions of a data transmission, iteration instructions indicating a quantity of iterations to perform on the first set of multiple repetitions, or a combination thereof. The operations of 1505 may be performed in accordance with examples as disclosed herein. In some examples, aspects of the operations of 1505 may be performed by an assistance information component 625 as described with reference to FIG. 6.

At 1510, the method may include monitoring for one or more repetitions of the first set of multiple repetitions. The operations of 1510 may be performed in accordance with examples as disclosed herein. In some examples, aspects of the operations of 1510 may be performed by a repetition component 630 as described with reference to FIG. 6.

At 1515, the method may include transmitting a CSI report based on combining a second set of multiple repetitions in accordance with at least one decoder iteration of a repetition of the second set of multiple repetitions, where the second set of multiple repetitions are associated with a first set of transmission parameters. The operations of 1515 may be performed in accordance with examples as disclosed herein. In some examples, aspects of the operations of 1515 may be performed by a CSI component 650 as described with reference to FIG. 6.

At 1520, the method may include receiving a second set of transmission parameters associated with the first set of multiple repetitions, where decoding the one or more repetitions of the first set of multiple repetitions is in accordance with the second set of transmission parameters. The operations of 1520 may be performed in accordance with examples as disclosed herein. In some examples, aspects of the operations of 1520 may be performed by a repetition component 630 as described with reference to FIG. 6.

At 1525, the method may include transmitting a feedback message based on decoding the one or more repetitions of the first set of multiple repetitions or iterating the one or more repetitions of the first set of multiple repetitions in accordance with the decoding order, the iteration instructions, or any combination thereof. The operations of 1525 may be performed in accordance with examples as disclosed herein. In some examples, aspects of the operations of 1525 may be performed by a feedback component 635 as described with reference to FIG. 6.

Figure 16:
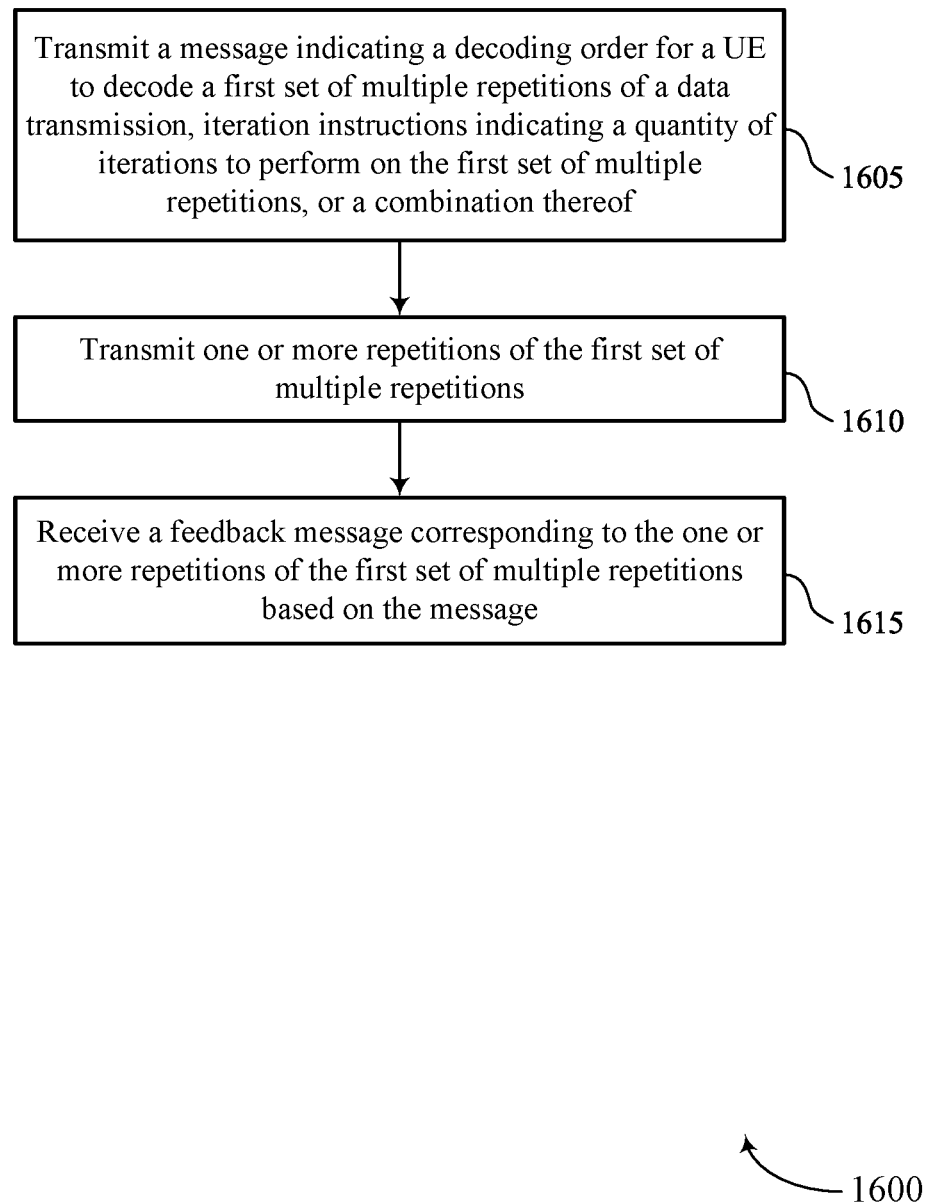

FIG. 16 illustrates a flowchart showing a method 1600 that supports network entity assisted decoding for repetition-based transmissions in accordance with one or more aspects of the present disclosure. The operations of the method 1600 may be implemented by a network entity or its components as described herein. For example, the operations of the method 1600 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a message indicating a decoding order for a UE to decode a first set of multiple repetitions of a data transmission, iteration instructions indicating a quantity of iterations to perform on the first set of multiple repetitions, or a combination thereof. The operations of 1605 may be performed in accordance with examples as disclosed herein. In some examples, aspects of the operations of 1605 may be performed by an assistance information component 1025 as described with reference to FIG. 10.

At 1610, the method may include transmitting one or more repetitions of the first set of multiple repetitions. The operations of 1610 may be performed in accordance with examples as disclosed herein. In some examples, aspects of the operations of 1610 may be performed by a repetition component 1030 as described with reference to FIG. 10.

At 1615, the method may include receiving a feedback message corresponding to the one or more repetitions of the first set of multiple repetitions based on the message. The operations of 1615 may be performed in accordance with examples as disclosed herein. In some examples, aspects of the operations of 1615 may be performed by a feedback component 1035 as described with reference to FIG. 10.

Figure 17:
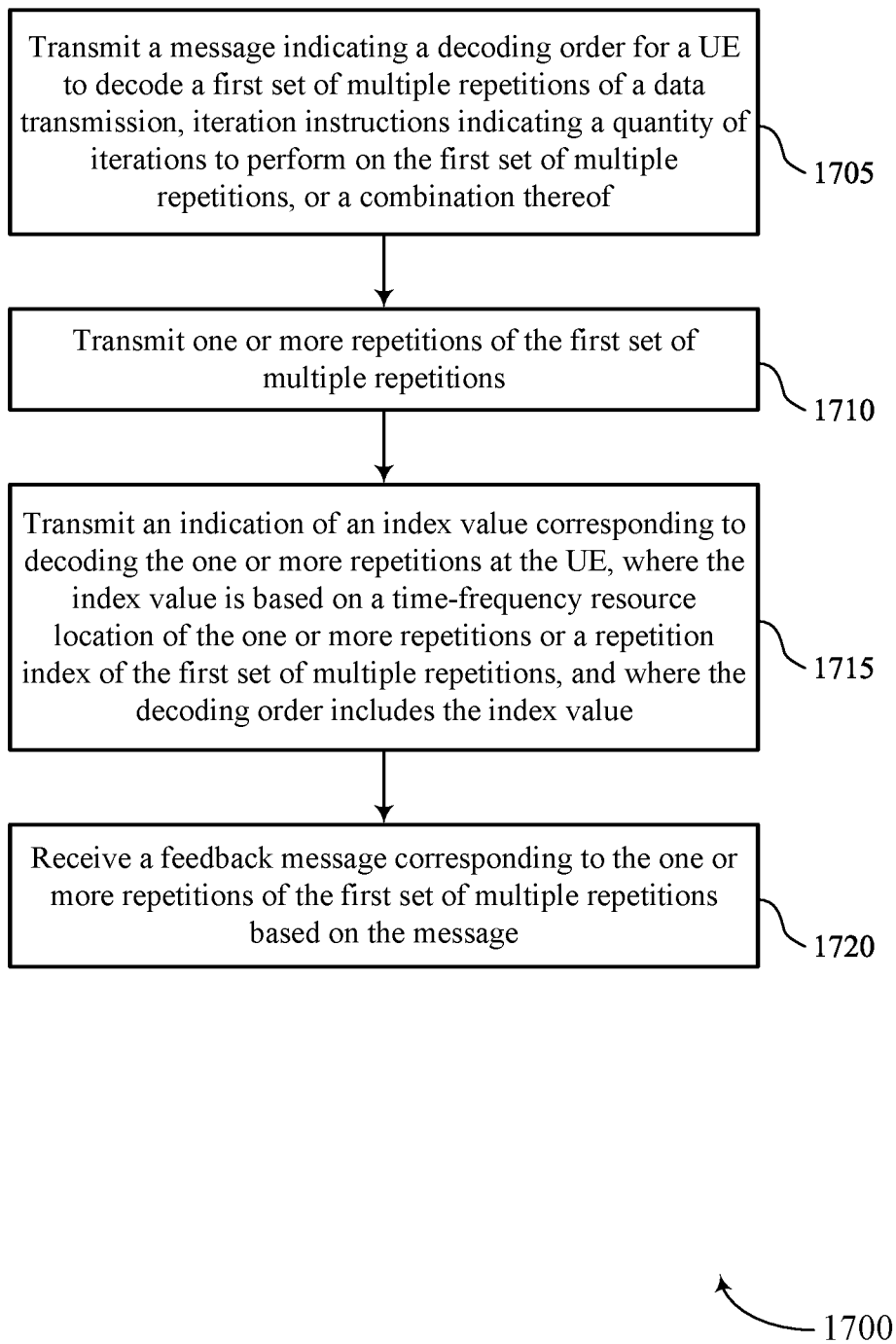

FIG. 17 illustrates a flowchart showing a method 1700 that supports network entity assisted decoding for repetition-based transmissions in accordance with one or more aspects of the present disclosure. The operations of the method 1700 may be implemented by a network entity or its components as described herein. For example, the operations of the method 1700 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a message indicating a decoding order for a UE to decode a first set of multiple repetitions of a data transmission, iteration instructions indicating a quantity of iterations to perform on the first set of multiple repetitions, or a combination thereof. The operations of 1705 may be performed in accordance with examples as disclosed herein. In some examples, aspects of the operations of 1705 may be performed by an assistance information component 1025 as described with reference to FIG. 10.

At 1710, the method may include transmitting one or more repetitions of the first set of multiple repetitions. The operations of 1710 may be performed in accordance with examples as disclosed herein. In some examples, aspects of the operations of 1710 may be performed by a repetition component 1030 as described with reference to FIG. 10.

At 1715, the method may include transmitting an indication of an index value corresponding to decoding the one or more repetitions at the UE, where the index value is based on a time-frequency resource location of the one or more repetitions or a repetition index of the first set of multiple repetitions, and where the decoding order includes the index value. The operations of 1715 may be performed in accordance with examples as disclosed herein. In some examples, aspects of the operations of 1715 may be performed by an index component 1040 as described with reference to FIG. 10.

At 1720, the method may include receiving a feedback message corresponding to the one or more repetitions of the first set of multiple repetitions based on the message. The operations of 1720 may be performed in accordance with examples as disclosed herein. In some examples, aspects of the operations of 1720 may be performed by a feedback component 1035 as described with reference to FIG. 10.

Figure 18:
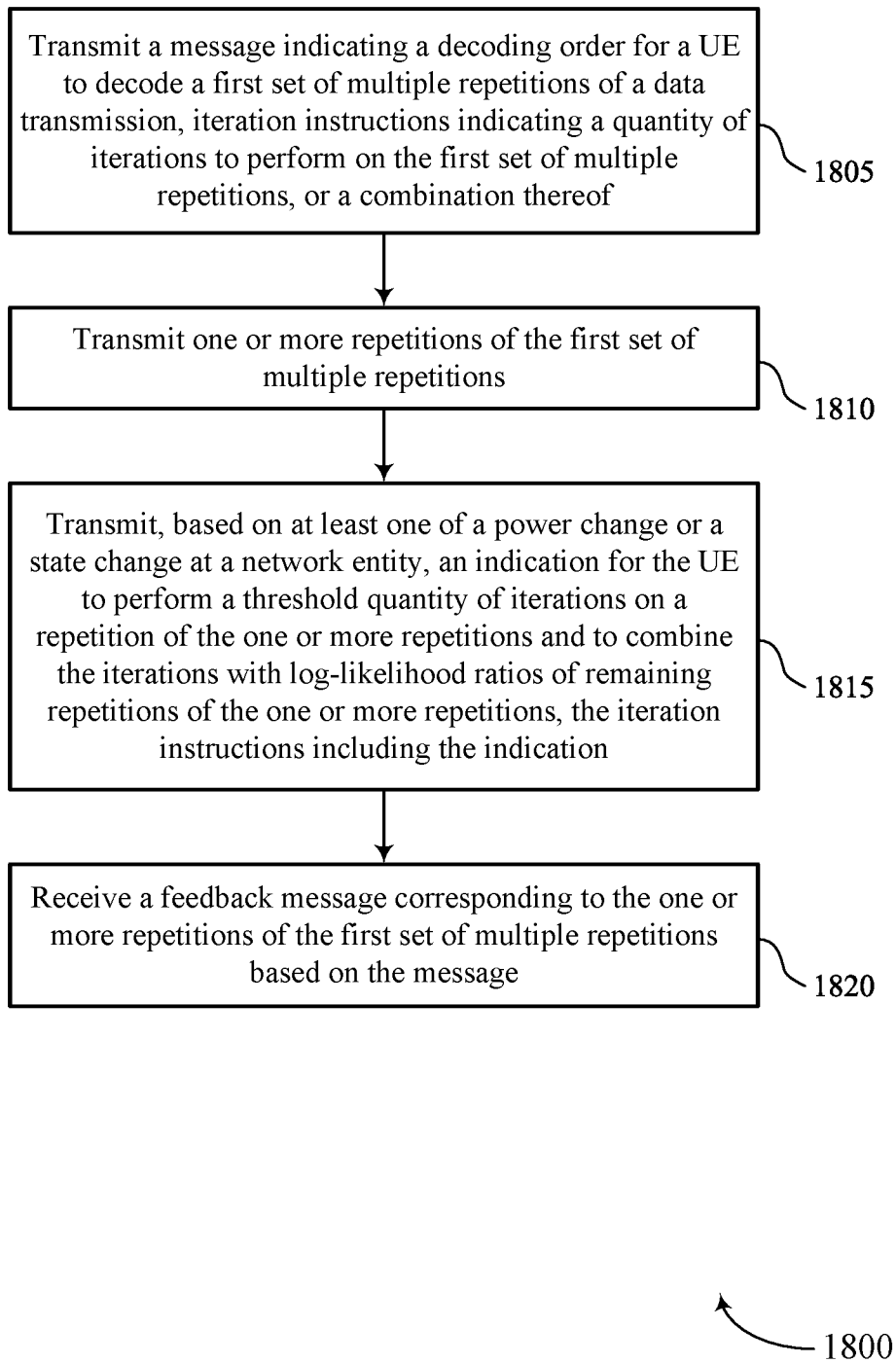

FIG. 18 illustrates a flowchart showing a method 1800 that supports network entity assisted decoding for repetition-based transmissions in accordance with one or more aspects of the present disclosure. The operations of the method 1800 may be implemented by a network entity or its components as described herein. For example, the operations of the method 1800 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a message indicating a decoding order for a UE to decode a first set of multiple repetitions of a data transmission, iteration instructions indicating a quantity of iterations to perform on the first set of multiple repetitions, or a combination thereof. The operations of 1805 may be performed in accordance with examples as disclosed herein. In some examples, aspects of the operations of 1805 may be performed by an assistance information component 1025 as described with reference to FIG. 10.

At 1810, the method may include transmitting one or more repetitions of the first set of multiple repetitions. The operations of 1810 may be performed in accordance with examples as disclosed herein. In some examples, aspects of the operations of 1810 may be performed by a repetition component 1030 as described with reference to FIG. 10.

At 1815, the method may include transmitting, based on at least one of a power change or a state change at a network entity, an indication for the UE to perform a threshold quantity of iterations on a repetition of the one or more repetitions and to combine the iterations with LLRs of remaining repetitions of the one or more repetitions, the iteration instructions including the indication. The operations of 1815 may be performed in accordance with examples as disclosed herein. In some examples, aspects of the operations of 1815 may be performed by an assistance information component 1025 as described with reference to FIG. 10.

At 1820, the method may include receiving a feedback message corresponding to the one or more repetitions of the first set of multiple repetitions based on the message. The operations of 1820 may be performed in accordance with examples as disclosed herein. In some examples, aspects of the operations of 1820 may be performed by a feedback component 1035 as described with reference to FIG. 10.

Figure 19:
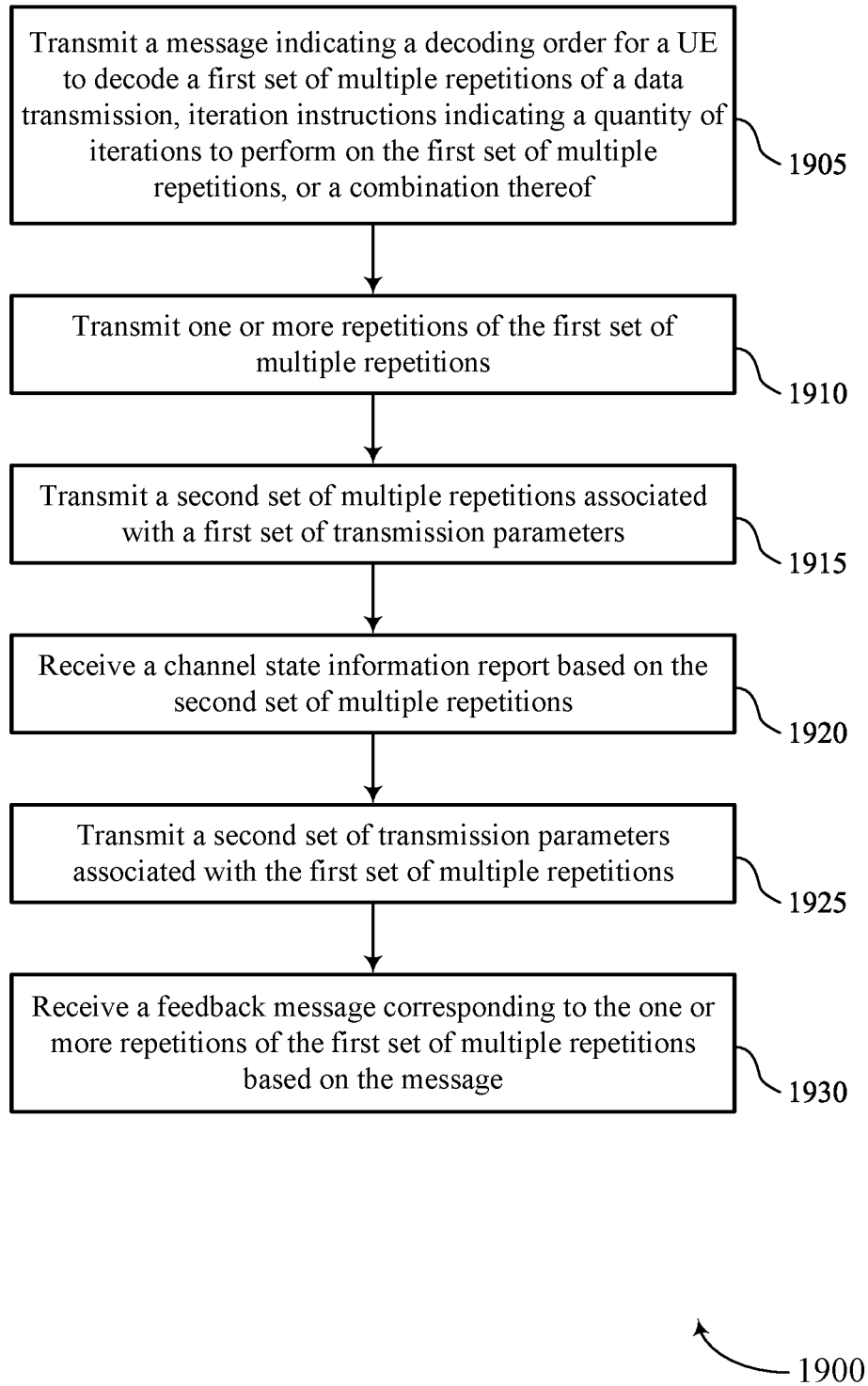

FIG. 19 illustrates a flowchart showing a method 1900 that supports network entity assisted decoding for repetition-based transmissions in accordance with one or more aspects of the present disclosure. The operations of the method 1900 may be implemented by a network entity or its components as described herein. For example, the operations of the method 1900 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1905, the method may include transmitting a message indicating a decoding order for a UE to decode a first set of multiple repetitions of a data transmission, iteration instructions indicating a quantity of iterations to perform on the first set of multiple repetitions, or a combination thereof. The operations of 1905 may be performed in accordance with examples as disclosed herein. In some examples, aspects of the operations of 1905 may be performed by an assistance information component 1025 as described with reference to FIG. 10.

At 1910, the method may include transmitting one or more repetitions of the first set of multiple repetitions. The operations of 1910 may be performed in accordance with examples as disclosed herein. In some examples, aspects of the operations of 1910 may be performed by a repetition component 1030 as described with reference to FIG. 10.

At 1915, the method may include transmitting a second set of multiple repetitions associated with a first set of transmission parameters. The operations of 1915 may be performed in accordance with examples as disclosed herein. In some examples, aspects of the operations of 1915 may be performed by a repetition component 1030 as described with reference to FIG. 10.

At 1920, the method may include receiving a CSI report based on the second set of multiple repetitions. The operations of 1920 may be performed in accordance with examples as disclosed herein. In some examples, aspects of the operations of 1920 may be performed by a CSI component 1050 as described with reference to FIG. 10.

At 1925, the method may include transmitting a second set of transmission parameters associated with the first set of multiple repetitions. The operations of 1925 may be performed in accordance with examples as disclosed herein. In some examples, aspects of the operations of 1925 may be performed by a repetition component 1030 as described with reference to FIG. 10.

At 1930, the method may include receiving a feedback message corresponding to the one or more repetitions of the first set of multiple repetitions based on the message. The operations of 1930 may be performed in accordance with examples as disclosed herein. In some examples, aspects of the operations of 1930 may be performed by a feedback component 1035 as described with reference to FIG. 10.

The following provides an overview of aspects of the present disclosure:

Aspect 1: A method for wireless communication at a UE, comprising: receiving a message indicating a decoding order for the UE to decode a first plurality of repetitions of a data transmission, iteration instructions indicating a quantity of iterations to perform on the first plurality of repetitions, or a combination thereof; monitoring for one or more repetitions of the first plurality of repetitions; and transmitting a feedback message based at least in part on decoding the one or more repetitions of the first plurality of repetitions or iterating the one or more repetitions of the first plurality of repetitions in accordance with the decoding order, the iteration instructions, or any combination thereof.

Aspect 2: The method of claim 1, further comprising: receiving an indication of a threshold quantity of repetitions, wherein the one or more repetitions comprises the threshold quantity of repetitions, and wherein the decoding order comprises the threshold quantity of repetitions; and decoding the one or more repetitions after receiving the threshold quantity of repetitions.

Aspect 3: The method of claim 1, wherein receiving the message comprises: receiving an indication of an index value corresponding to decoding the one or more repetitions, wherein the index value is based at least in part on a time-frequency resource location of the one or more repetitions or a repetition index of the first plurality of repetitions, and wherein the decoding order comprises the index value; and decoding the one or more repetitions starting at the index value.

Aspect 4: The method of claim 1, further comprising: receiving an indication of a redundancy version sequence corresponding to a redundancy version pattern and the decoding order, wherein the one or more repetitions are received in accordance with the redundancy version sequence; and decoding the one or more repetitions in accordance with the redundancy version pattern and the decoding order.

Aspect 5: The method of claim 1, wherein receiving the message comprises: receiving, based at least in part on at least one of a power change or a state change at a network entity, an indication for the UE to perform a threshold quantity of iterations on a repetition of the one or more repetitions and to combine the iterations with log-likelihood ratios of remaining repetitions of the one or more repetitions, wherein decoding the one or more repetitions is in accordance with the indication, the iteration instructions comprising the indication.

Aspect 6: The method of any of aspects 1 through 5, wherein receiving the message comprises: transmitting a channel state information report based at least in part on combining a second plurality of repetitions in accordance with at least one decoder iteration of a repetition of the second plurality of repetitions, wherein the second plurality of repetitions are associated with a first set of transmission parameters; and receiving a second set of transmission parameters associated with the first plurality of repetitions, wherein decoding the one or more repetitions of the first plurality of repetitions is in accordance with the second set of transmission parameters.

Aspect 7: The method of claim 6, wherein the first set of transmission parameters and the second set of transmission parameters comprise a modulation and coding scheme, a rank parameter, a power control parameter, a beamforming parameter, a transmission-reception point panel parameter, a quantity of repetitions, or any combination thereof.

Aspect 8: The method of claim 1, wherein the decoding order is based at least in part on a priority of the data transmission, a quality of service of the data transmission, a latency of the data transmission, or any combination thereof.

Aspect 9: The method of claim 1, wherein the message schedules a downlink shared channel repetition.

Aspect 10: The method of claim 1, wherein the message is dedicated to the decoding order, the iteration instructions, or both.

Aspect 11: The method of claim 1, further comprising: selectively combining respective log-likelihood ratios associated with the one or more repetitions based at least in part on a first comparison between the respective log-likelihood ratios associated with the one or more repetitions, a second comparison between a ratio of the respective log-likelihood ratios and a parameter, or both, wherein decoding the one or more repetitions is based at least in part on the selective combining of the respective log-likelihood ratios.

Aspect 12: The method of claim 1, further comprising: determining a coefficient for combining respective log-likelihood ratios associated with the one or more repetitions based at least in part on a prior data transmission on a same beam as the data transmission, a channel state information measurement, a sounding reference signal measurement, or any combination thereof, wherein decoding the one or more repetitions is based at least in part on combining the respective log-likelihood ratios in accordance with the coefficient.

Aspect 13: The method of claim 1, further comprising: demodulating, at a first demodulator associated with the UE, a repetition of the one or more repetitions to obtain a first demodulated signal corresponding to the data transmission and to obtain a first log-likelihood ratio; selectively demodulating, at a second demodulator associated with the UE, the repetition of the one or more repetitions to obtain a second demodulated signal corresponding to the data transmission and to obtain a second log-likelihood ratio, wherein selectively demodulating the repetition is based at least in part on a first cyclic redundancy check of the first demodulated signal; and selectively combining the first log-likelihood ratio and the second log-likelihood ratio based at least in part on a second cyclic redundancy check of the second demodulated signal, wherein decoding the one or more repetitions is based on at least one of demodulating the repetition at the first demodulator, selectively demodulating the repetition at the second demodulator, or selectively combining the first log-likelihood ratio and the second log-likelihood ratio.

Aspect 14: The method of claim 13, wherein the feedback message indicates a successful demodulation of the repetition based at least in part on demodulating the repetition at the first demodulator.

Aspect 15: The method of aspect 14, further comprising: refraining from demodulating the repetition at the second demodulator and refraining from combining the first log-likelihood ratio and the second log-likelihood ratio based at least in part on the successful demodulation of the repetition.

Aspect 16: The method of claim 13, wherein the feedback message indicates a successful demodulation of the repetition based at least in part on demodulating the repetition at the second demodulator.

Aspect 17: The method of aspect 16, further comprising: refraining from combining the first log-likelihood ratio and the second log-likelihood ratio based at least in part on the successful demodulation of the repetition.

Aspect 18: The method of claim 13, wherein the feedback message indicates a successful demodulation of the repetition based at least in part on a third cyclic redundancy check associated with combining the first log-likelihood ratio and the second log-likelihood ratio passing.

Aspect 19: The method of claim 13, wherein the feedback message indicates a failed demodulation of the repetition based at least in part on a third cyclic redundancy check associated with combining the first log-likelihood ratio and the second log-likelihood ratio failing.

Aspect 20: A method for wireless communication at a network entity, comprising: transmitting a message indicating a decoding order for a UE to decode a first plurality of repetitions of a data transmission, iteration instructions indicating a quantity of iterations to perform on the first plurality of repetitions, or a combination thereof; transmitting one or more repetitions of the first plurality of repetitions; and receiving a feedback message corresponding to the one or more repetitions of the first plurality of repetitions based at least in part on the message.

Aspect 21: The method of claim 21, further comprising: transmitting an indication of a threshold quantity of repetitions, wherein the one or more repetitions comprises the threshold quantity of repetitions, and wherein the decoding order comprises the threshold quantity of repetitions.

Aspect 22: The method of claim 21, wherein transmitting the message comprises: transmitting an indication of an index value corresponding to decoding the one or more repetitions at the UE, wherein the index value is based at least in part on a time-frequency resource location of the one or more repetitions or a repetition index of the first plurality of repetitions, and wherein the decoding order comprises the index value.

Aspect 23: The method of claim 21, further comprising: transmitting an indication of a redundancy version sequence corresponding to a redundancy version pattern and the decoding order, wherein the one or more repetitions are transmitted in accordance with the redundancy version sequence.

Aspect 24: The method of claim 21, wherein transmitting the message comprises: transmitting, based at least in part on at least one of a power change or a state change at a network entity, an indication for the UE to perform a threshold quantity of iterations on a repetition of the one or more repetitions and to combine the iterations with log-likelihood ratios of remaining repetitions of the one or more repetitions, the iteration instructions comprising the indication.

Aspect 25: The method of any of aspects 20 through 24, wherein transmitting the message comprises: transmitting a second plurality of repetitions associated with a first set of transmission parameters; receiving a channel state information report based at least in part on the second plurality of repetitions; and transmitting a second set of transmission parameters associated with the first plurality of repetitions.

Aspect 26: The method of claim 26, wherein the first set of transmission parameters and the second set of transmission parameters comprise a modulation and coding scheme, a rank parameter, a power control parameter, a beamforming parameter, a transmission-reception point panel parameter, a quantity of repetitions, or any combination thereof.

Aspect 27: The method of claim 21, wherein the decoding order is based at least in part on a priority of the data transmission, a quality of service of the data transmission, a latency of the data transmission, or any combination thereof.

Aspect 28: The method of claim 21, wherein the message schedules a downlink shared channel repetition.

Aspect 29: The method of claim 21, wherein the message is dedicated to the decoding order, the iteration instructions, or both.

Aspect 30: The method of claim 21, wherein the feedback message indicates a successful demodulation of the one or more repetitions.

Aspect 31: The method of claim 21, wherein the feedback message indicates a failed demodulation of the one or more repetitions.

Aspect 32: An apparatus comprising a processor; memory coupled with the processor; and instructions stored in the memory and executable by the processor to cause the apparatus to perform a method of any of aspects 1 through 19.

Aspect 33: An apparatus comprising at least one means for performing a method of any of aspects 1 through 19.

Aspect 34: A non-transitory computer-readable medium storing code the code comprising instructions executable by a processor to perform a method of any of aspects 1 through 19.

Aspect 35: An apparatus for wireless communication at a network entity, comprising a processor; memory coupled with the processor; and instructions stored in the memory and executable by the processor to cause the apparatus to perform a method of any of aspects 20 through 31.

Aspect 36: An apparatus for wireless communication at a network entity, comprising at least one means for performing a method of any of aspects 20 through 31.

Aspect 37: A non-transitory computer-readable medium storing code for wireless communication at a network entity, the code comprising instructions executable by a processor to perform a method of any of aspects 20 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   one or more processors;
   one or more memories coupled with the one or more processors; and
   instructions stored in the one or more memories and executable by the processor one or more processors to cause the apparatus to:
   receive a message indicating a decoding order for a user equipment (UE) to decode a first plurality of repetitions of a data transmission, iteration instructions indicating a quantity of iterations to perform on the first plurality of repetitions, or a combination thereof;
   monitor for one or more repetitions of the first plurality of repetitions; and
   transmit a feedback message based at least in part on decoding the one or more repetitions of the first plurality of repetitions or iterating the one or more repetitions of the first plurality of repetitions in accordance with the decoding order, the iteration instructions, or any combination thereof.

2. The apparatus of claim 1, wherein the instructions are further executable by the one or more processors to cause the apparatus to:
   receive an indication of a threshold quantity of repetitions, wherein the one or more repetitions comprises the threshold quantity of repetitions, and wherein the decoding order comprises the threshold quantity of repetitions; and
   decode the one or more repetitions after receiving the threshold quantity of repetitions.

3. The apparatus of claim 1, wherein the instructions to receive the message are executable by the one or more processors to cause the apparatus to:
   receive an indication of an index value corresponding to decoding the one or more repetitions, wherein the index value is based at least in part on a time-frequency resource location of the one or more repetitions or a repetition index of the first plurality of repetitions, and wherein the decoding order comprises the index value; and
   decode the one or more repetitions starting at the index value.

4. The apparatus of claim 1, wherein the instructions are further executable by the one or more processors to cause the apparatus to:
  receive an indication of a redundancy version sequence corresponding to a redundancy version pattern and the decoding order, wherein the one or more repetitions are received in accordance with the redundancy version sequence; and
  decode the one or more repetitions in accordance with the redundancy version pattern and the decoding order.

5. The apparatus of claim 1, wherein the instructions to receive the message are executable by the one or more processors to cause the apparatus to:
  receive, based at least in part on at least one of a power change or a state change at a network entity, an indication for the UE to perform a threshold quantity of iterations on a repetition of the one or more repetitions and to combine the iterations with log-likelihood ratios of remaining repetitions of the one or more repetitions, wherein decoding the one or more repetitions is in accordance with the indication, the iteration instructions comprising the indication.

6. The apparatus of claim 1, wherein the instructions to receive the message are executable by the one or more processors to cause the apparatus to:
  transmit a channel state information report based at least in part on combining a second plurality of repetitions in accordance with at least one decoder iteration of a repetition of the second plurality of repetitions, wherein the second plurality of repetitions are associated with a first set of transmission parameters; and
  receive a second set of transmission parameters associated with the first plurality of repetitions, wherein decoding the one or more repetitions of the first plurality of repetitions is in accordance with the second set of transmission parameters.

7. The apparatus of claim 6, wherein the first set of transmission parameters and the second set of transmission parameters comprise a modulation and coding scheme, a rank parameter, a power control parameter, a beamforming parameter, a transmission-reception point panel parameter, a quantity of repetitions, or any combination thereof.

8. The apparatus of claim 1, wherein the decoding order is based at least in part on a priority of the data transmission, a quality of service of the data transmission, a latency of the data transmission, or any combination thereof.

9. The apparatus of claim 1, wherein the message schedules a downlink shared channel repetition.

10. The apparatus of claim 1, wherein the message is dedicated to the decoding order, the iteration instructions, or both.

11. The apparatus of claim 1, wherein the instructions are further executable by the one or more processors to cause the apparatus to:
  selectively combine respective log-likelihood ratios associated with the one or more repetitions based at least in part on a first comparison between the respective log-likelihood ratios associated with the one or more repetitions, a second comparison between a ratio of the respective log-likelihood ratios and a parameter, or both, wherein decoding the one or more repetitions is based at least in part on the selective combining of the respective log-likelihood ratios.

12. The apparatus of claim 1, wherein the instructions are further executable by the one or more processors to cause the apparatus to:
  determine a coefficient for combining respective log-likelihood ratios associated with the one or more repetitions based at least in part on a prior data transmission on a same beam as the data transmission, a channel state information measurement, a sounding reference signal measurement, or any combination thereof, wherein decoding the one or more repetitions is based at least in part on combining the respective log-likelihood ratios in accordance with the coefficient.

13. The apparatus of claim 1, wherein the instructions are further executable by the one or more processors to cause the apparatus to:
  demodulate, at a first demodulator associated with the UE, a repetition of the one or more repetitions to obtain a first demodulated signal corresponding to the data transmission and to obtain a first log-likelihood ratio;
  selectively demodulate, at a second demodulator associated with the UE, the repetition of the one or more repetitions to obtain a second demodulated signal corresponding to the data transmission and to obtain a second log-likelihood ratio, wherein selectively demodulating the repetition is based at least in part on a first cyclic redundancy check of the first demodulated signal; and
  selectively combine the first log-likelihood ratio and the second log-likelihood ratio based at least in part on a second cyclic redundancy check of the second demodulated signal, wherein decoding the one or more repetitions is based on at least one of demodulating the repetition at the first demodulator, selectively demodulating the repetition at the second demodulator, or selectively combining the first log-likelihood ratio and the second log-likelihood ratio.

14. The apparatus of claim 13, wherein the feedback message indicates a successful demodulation of the repetition based at least in part on demodulating the repetition at the first demodulator.

15. The apparatus of claim 14, wherein the instructions are further executable by the one or more processors to cause the apparatus to:
  refrain from demodulating the repetition at the second demodulator and refraining from combining the first log-likelihood ratio and the second log-likelihood ratio based at least in part on the successful demodulation of the repetition.

16. The apparatus of claim 13, wherein the feedback message indicates a successful demodulation of the repetition based at least in part on demodulating the repetition at the second demodulator.

17. The apparatus of claim 16, wherein the instructions are further executable by the one or more processors to cause the apparatus to:
  refrain from combining the first log-likelihood ratio and the second log-likelihood ratio based at least in part on the successful demodulation of the repetition.

18. The apparatus of claim 13, wherein the feedback message indicates a successful demodulation of the repetition based at least in part on a third cyclic redundancy check associated with combining the first log-likelihood ratio and the second log-likelihood ratio passing.

19. The apparatus of claim 13, wherein the feedback message indicates a failed demodulation of the repetition based at least in part on a third cyclic redundancy check associated with combining the first log-likelihood ratio and the second log-likelihood ratio failing.

20. A method for wireless communication at a user equipment (UE), comprising:

receiving a message indicating a decoding order for the UE to decode a first plurality of repetitions of a data transmission, iteration instructions indicating a quantity of iterations to perform on the first plurality of repetitions, or a combination thereof;

monitoring for one or more repetitions of the first plurality of repetitions; and transmitting a feedback message based at least in part on decoding the one or more repetitions of the first plurality of repetitions or iterating the one or more repetitions of the first plurality of repetitions in accordance with the decoding order, the iteration instructions, or any combination thereof.

21. The method of claim 20, further comprising:

receiving an indication of a threshold quantity of repetitions, wherein the one or more repetitions comprises the threshold quantity of repetitions, and wherein the decoding order comprises the threshold quantity of repetitions; and decoding the one or more repetitions after receiving the threshold quantity of repetitions.

22. The method of claim 20, wherein receiving the message comprises:

receiving an indication of an index value corresponding to decoding the one or more repetitions, wherein the index value is based at least in part on a time-frequency resource location of the one or more repetitions or a repetition index of the first plurality of repetitions, and wherein the decoding order comprises the index value; and decoding the one or more repetitions starting at the index value.

23. The method of claim 20, further comprising:

receiving an indication of a redundancy version sequence corresponding to a redundancy version pattern and the decoding order, wherein the one or more repetitions are received in accordance with the redundancy version sequence; and decoding the one or more repetitions in accordance with the redundancy version pattern and the decoding order.

24. The method of claim 20, wherein receiving the message comprises:

receiving, based at least in part on at least one of a power change or a state change at a network entity, an indication for the UE to perform a threshold quantity of iterations on a repetition of the one or more repetitions and to combine the iterations with log-likelihood ratios of remaining repetitions of the one or more repetitions, wherein decoding the one or more repetitions is in accordance with the indication, the iteration instructions comprising the indication.

25. The method of claim 20, wherein receiving the message comprises:

transmitting a channel state information report based at least in part on combining a second plurality of repetitions in accordance with at least one decoder iteration of a repetition of the second plurality of repetitions, wherein the second plurality of repetitions are associated with a first set of transmission parameters; and receive a second set of transmission parameters associated with the first plurality of repetitions, wherein decoding the one or more repetitions of the first plurality of repetitions is in accordance with the second set of transmission parameters.

26. The method of claim 20, further comprising:

selectively combining respective log-likelihood ratios associated with the one or more repetitions based at least in part on a first comparison between the respective log-likelihood ratios associated with the one or more repetitions, a second comparison between a ratio of the respective log-likelihood ratios and a parameter, or both, wherein decoding the one or more repetitions is based at least in part on the selective combining of the respective log-likelihood ratios.

27. The method of claim 20, further comprising:

determining a coefficient for combining respective log-likelihood ratios associated with the one or more repetitions based at least in part on a prior data transmission on a same beam as the data transmission, a channel state information measurement, a sounding reference signal measurement, or any combination thereof, wherein decoding the one or more repetitions is based at least in part on combining the respective log-likelihood ratios in accordance with the coefficient.

28. The method of claim 20, further comprising:

demodulating, at a first demodulator associated with the UE, a repetition of the one or more repetitions to obtain a first demodulated signal corresponding to the data transmission and to obtain a first log-likelihood ratio;

selectively demodulating, at a second demodulator associated with the UE, the repetition of the one or more repetitions to obtain a second demodulated signal corresponding to the data transmission and to obtain a second log-likelihood ratio, wherein selectively demodulating the repetition is based at least in part on a first cyclic redundancy check of the first demodulated signal; and selectively combining the first log-likelihood ratio and the second log-likelihood ratio based at least in part on a second cyclic redundancy check of the second demodulated signal, wherein decoding the one or more repetitions is based on at least one of demodulating the repetition at the first demodulator, selectively demodulating the repetition at the second demodulator, or selectively combining the first log-likelihood ratio and the second log-likelihood ratio.

29. A user equipment (UE) for wireless communication, comprising:

means for receiving a message indicating a decoding order for the UE to decode a first plurality of repetitions of a data transmission, iteration instructions indicating a quantity of iterations to perform on the first plurality of repetitions, or a combination thereof;

means for monitoring for one or more repetitions of the first plurality of repetitions; and means for transmitting a feedback message based at least in part on decoding the one or more repetitions of the first plurality of repetitions or iterating the one or more repetitions of the first plurality of repetitions in accordance with the decoding order, the iteration instructions, or any combination thereof.

30. A non-transitory computer-readable medium storing code for wireless communication, the code comprising instructions executable by one or more processors to:

receive a message indicating a decoding order for a user equipment (UE) to decode a first plurality of repetitions of a data transmission, iteration instructions indicating a quantity of iterations to perform on the first plurality of repetitions, or a combination thereof;

monitor for one or more repetitions of the first plurality of repetitions; and transmit a feedback message based at least in part on decoding the one or more repetitions of the first plurality of repetitions or iterating the one or more repetitions of the first plurality of repetitions in accordance with the decoding order, the iteration instructions, or any combination thereof.

* * * * *